(12) United States Patent
Takeda et al.

(10) Patent No.: US 6,584,155 B2
(45) Date of Patent: Jun. 24, 2003

(54) METHOD AND SYSTEM FOR ESTIMATING MOTION VECTOR

(75) Inventors: Hideki Takeda, Kawasaki (JP); Kunihiko Yahagi, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 300 days.

(21) Appl. No.: 09/746,020

(22) Filed: Dec. 26, 2000

(65) Prior Publication Data

US 2001/0008545 A1 Jul. 19, 2001

(30) Foreign Application Priority Data

Dec. 27, 1999 (JP) ............................................. 11-369353
Dec. 20, 2000 (JP) ........................................ 2000-387684

(51) Int. Cl.$^7$ .......................... H04N 7/12; H04N 11/02; H04N 11/04
(52) U.S. Cl. .......................... 375/240.16; 375/240.16; 382/236; 348/699
(58) Field of Search ................................ 348/699, 700, 348/407.1, 416.1, 413.1; 375/240.12, 240.16; 382/232, 236; H04N 7/12, 11/02, 11/04

(56) References Cited

U.S. PATENT DOCUMENTS

| 5,181,111 | A | * | 1/1993 | Hedley et al. ............... 348/452 |
| 5,398,078 | A | * | 3/1995 | Masuda et al. .............. 348/699 |
| 5,430,480 | A | * | 7/1995 | Allen et al. ............... 348/208.4 |
| 5,471,252 | A | * | 11/1995 | Iu ............................... 348/699 |
| 6,008,852 | A | * | 12/1999 | Nakaya ................. 375/240.16 |
| 6,084,912 | A | * | 7/2000 | Reitmeier et al. ..... 375/240.11 |
| 6,256,343 | B1 | * | 7/2001 | Suzuki ........................ 375/240 |
| 6,278,736 | B1 | * | 8/2001 | De Haan et al. ........ 375/240.16 |
| 6,285,711 | B1 | * | 9/2001 | Ratakonda et al. .... 375/240.16 |
| 6,442,205 | B1 | * | 8/2002 | Nakaya ................. 375/240.16 |
| 6,470,050 | B1 | * | 10/2002 | Ohtani et al. .......... 375/240.16 |

FOREIGN PATENT DOCUMENTS

JP 5-227525 9/1993

* cited by examiner

Primary Examiner—Nhon Diep
(74) Attorney, Agent, or Firm—Oblon, Spivak, McClelland, Maier & Neustadt, P.C.

(57) ABSTRACT

The correlation between a coded block on the screen of the current image and a plurality of candidate blocks which exist in a search area on a reference screen temporally different from the current image and which has the same area as that of the coded block is obtained to select a candidate block having the highest correlation to obtain its displacement as a primary motion vector. Then, the positional relationship between a motion vector/corresponding candidate block and the reference screen is estimated to determine whether the search area/candidate block is positioned inside of the boundary of the reference screen. When a part of the search area/candidate block is positioned outside of the boundary, the position of the primary motion vector so that the search area/candidate block is located inside of the boundary of the reference. Thereafter, a secondary motion vector is estimated using the corrected motion vector and the correction quantity to obtain a desired motion vector on the basis of the primary motion vector, the correction quantity and the secondary motion vector. Thus, the correction quantity is added during the motion vector estimation for the edge of the reference screen, to put the search area in the reference screen during the estimation of a desired motion vector, so as to improve the estimation precision.

18 Claims, 14 Drawing Sheets

IN PRIMARY MOTION VECTOR ESTIMATION, ONLY PIXEL ○ CAN BE MOTION VECTOR CANDIDATE.

IN SECONDARY MOTION VECTOR ESTIMATION, PIXEL × ALSO CAN BE MOTION VETOR CANDIDATE TOGETHER WITH PIXEL ○.

CODED MACRO BLOCK (i,j)

| (0,0) | (1,0) | (2,0) | (3,0) | (4,0) | (5,0) | (6,0) | (7,0) |
|---|---|---|---|---|---|---|---|
| (0,1) | (1,1) | (2,1) | (3,1) | (4,1) | (5,1) | (6,1) | (7,1) |
| (0,2) | (1,2) | (2,2) | (3,2) | (4,2) | (5,2) | (6,2) | (7,2) |
| (0,3) | (1,3) | (2,3) | (3,3) | (4,3) | (5,3) | (6,3) | (7,3) |
| (0,4) | (1,4) | (2,4) | (3,4) | (4,4) | (5,4) | (6,4) | (7,4) |
| (0,5) | (1,5) | (2,5) | (3,5) | (4,5) | (5,5) | (6,5) | (7,5) |
| (0,6) | (1,6) | (2,6) | (3,6) | (4,6) | (5,6) | (6,6) | (7,6) |
| (0,7) | (1,7) | (2,7) | (3,7) | (4,7) | (5,7) | (6,7) | (7,7) |

FIG.3B

PIXELS OF REFERENCE IMAGE MACRO BLOCK (h+i, v+j) AND (h,v) ARE MATCHING POINT

| (h,v) | (h+1,v) | - - - | (h+7,v) |
|---|---|---|---|
| (h,v+1) | (h+1,v+1) | - - | (h+7,v+1) |
| | | | - - - |
| (h,v+7) | (h+1,v+7) | - - - | (h+7,v+7) |

FIG.3A

METHOD AND SYSTEM FOR ESTIMATING MOTION VECTOR

CROSS REFERENCE TO RELATED APPLICATION

This application claims benefit of priority under 35 U.S.C. §119 to Japanese Patent Application No. 1999-369353, filed on Dec. 27, 1999, and Japanese Patent Application No. 2000-387684, filed on Dec. 20, 2000, the entire contents of which are incorporated by reference therein.

BACKGROUND OF THE INVENTION

The present invention relates generally to a method and system for estimating a motion vector. More specifically, the invention relates to a motion vector estimating method and system capable of searching a candidate motion vector of a picture element (pixel), which projects from a reference screen, with a precision of, e.g., half pixels, in a process for estimating a motion vector of a dynamic image, and a recording medium in which a motion vector estimating procedure has been recorded.

In general, a motion vector estimating system is used for compensating the motion of dynamic images and for compressing dynamic images. As systems which are often used for compressing dynamic images, there are MPEG1 and MPEG2 which are international standards having been standardized by MPEG (Moving Picture Experts Group). In MPEGs serving as these standards, a motion-compensated coding technique is used between temporally spaced screens in order to compress redundancy in a time direction. In this case, it is required to estimate motion vectors.

A typical motion vector estimation uses a technique for carrying out a block matching between a coded block on a coded image and a plurality of candidate blocks, which exist in a predetermined search area on a reference image and which have the same size as that of the coded block, and for determining a correlation between the blocks to use a displacement of a block having the highest correlation from the coded block, as a motion vector. The coded block means a block on the current image which is to be coded. The reference screen means the whole screen including a reference image. The candidate block means a block on a reference image to which reference is made when a motion vector of a certain coded block is estimated. The search area means a certain area in a reference screen including all of candidate blocks for a certain coded block.

In the block matching, the absolute value of the difference between pixels arranged at the same positions in two blocks is often calculated to be added with respect to pixels in the whole area of the blocks to be used as an index value indicative of the correlation. In this case, the correlation is high as the index value is small.

In a test model of MPEG2, it is recommended to use a precision of one pixel in the primary search and a precision of half pixels in the secondary search, as a precision of search of a motion vector. Usually, the original image is used as a reference image in the primary search, and a local decoded image, which is obtained by decoding image data coded in an encoder, is used as a reference image in the secondary search.

With respect to the processing of the edge of a reference screen during a motion vector estimation with a precision of one pixel, in a well-known motion vector estimating system, e.g., in a MPEG2 coding LSI (Large Scale Integrated-circuit) produced as a motion vector estimating system, a correction is carried out so that a search area does not project from the reference screen, i.e., an obtained motion vector is located within the reference screen, when a motion vector is estimated with a precision of one pixel in a certain coded block.

However, if a motion vector with a precision of one pixel in a certain coded block indicates the boundary of a reference screen, when a motion vector is estimated with a precision of half pixels using the motion vector with a precision of one pixel as the center of search, there is the possibility that a part of pixels in one or more candidate blocks in the search area project outwardly from the reference screen. For example, in FIG. 1 schematically showing the vicinity of the boundary of the reference screen, with respect to the uppermost leftmost one of candidate motion vectors with a precision of half pixels in an area 203, candidate blocks including the uppermost leftmost one as an upper left pixel correspond to an area, which is surrounded by a chain line in the figure, to include pixels outside of the reference screen.

In FIG. 1, a motion vector 201 with a precision of one pixel is position at the upper left corner of a screen edge of the reference screen. An area 204 projecting from the screen edge 202 of the reference screen exists in the area 203 of candidate motion vectors with a precision of half pixels in a case where the motion vector 201 is used as the center of search, and the candidate motion vectors in the area 204 can not be used for the operation of a motion vector estimation, so that only points in an area 205 among the candidate motion vectors with a precision of half pixels are actually used as candidate motion vectors.

The above described conventional coding LSI copes with such a case by carrying out the processing for estimating a candidate block including projecting pixels and excluding the estimated candidate block from the candidates for a motion vector estimation with a precision of half pixels.

In an image coding system disclosed in Japanese Patent Laid-Open No. 5-227525 filed by the applicant, there is provided means for controlling at least one of a search area in a secondary motion search and a motion vector estimation precision, in accordance with an area from which a motion vector estimated by a primary motion search is estimated in the search area, particularly as set forth in claim 5.

Also in the conventional motion vector estimating system, when the motion vector with a precision of one pixel indicates the boundary of the reference screen and when a part of the candidate blocks during the motion vector estimation with a precision of half pixels corresponding thereto project from the reference screen, the candidate blocks required for the motion vector estimation with a precision of half pixels can be searched by the above described two methods.

However, in the former prior art, the number of candidate motion vectors is smaller than that when all of the search area is located within the reference screen. For example, only four candidate motion vectors shown in the area 205 of the candidate motion vectors with a precision of half pixels in the area 203 shown in FIG. 3 are used as candidate motion vectors. Also when candidate blocks having the highest correlation exist just nearby the original search area on the reference screen, the candidate blocks are not located within objects to be estimated, so that there is a problem in that the estimation precision deteriorates in the motion vector estimation with a precision of half pixels obtained by the secondary motion estimation.

In the latter prior art, positions in the search area for primary motion vectors are used for controlling the search area during the secondary motion search, so that there is a problem in that it is not possible to determine whether the primary motion vector is positioned at the edge of the reference screen if position information in the above described search area on the reference screen is not obtained. In addition, when a hardware resource is used for calculating the correlation between coded blocks and candidate blocks, the construction of candidate blocks outwardly projecting from the reference screen is wasted, so that there is a problem in that the use efficiency of the hardware resource deteriorates.

SUMMARY OF THE INVENTION

It is therefore an object of the present invention to eliminate the aforementioned problems and to provide a motion vector estimating system and method capable of putting a search area, which is used when a motion vector estimation with a precision of half pixels is carried out, in a reference screen by adding a correction value when a motion vector of a pixel located at the edge of a reference screen is estimated, thereby improving the precision of estimation of a motion vector with a precision of half pixels.

It is another object of the present invention to provide a motion vector estimating system and method which sufficiently improves the precision of estimation of a motion vector by sufficiently ensuring a search area when a motion vector with a precision of half pixels is estimated, since the original image is used as a reference image even in the estimation of a motion vector with a precision of one pixel which is not more extremely precise than the estimation of a motion vector with a precision of half pixels.

In order to accomplish the aforementioned and other objects, a motion vector estimating method according to a first basic construction of the present invention, comprises the steps of: obtaining the correlation between a coded block occupying an optional area on a screen of a coded current image, and a plurality of candidate blocks which exist in a search area having an optional size on a screen of a reference image temporally different from the current image and which occupies the same area as that of the coded block; selecting a candidate block having the highest correlation from the plurality of candidate blocks to obtain a displacement at that time as a primary motion vector; determining a secondary search area on the basis of the primary motion vector to estimate a positional relationship between a plurality of secondary candidate blocks, which occupy the same area as that of the coded block existing in the determined secondary search area, or the primary motion vector and the reference screen to determine whether the secondary search area or the secondary candidate block is positioned outside of the boundary of the reference screen; correcting the position on the basis of the primary motion vector so that the secondary search area or the secondary candidate block is located inside of the boundary of the reference screen, when it is determined that a part of the secondary search area or secondary candidate block is positioned outside of the boundary; obtaining the correlation between the plurality of corrected secondary candidate blocks, which exist in the corrected secondary search area based on the motion vector, the position of which has been corrected, and which occupy the same area as that of the coded block, and the coded block; selecting a secondary candidate block having the highest correlation from the plurality of secondary candidate blocks to obtain a displacement at that time as a secondary motion vector; and obtaining a desired motion vector on the basis of the primary motion vector, the correction quantity and the secondary motion vector. Here, a corrected primary motion vector can be obtained by correcting the motion vector by the correction quantity.

In the motion vector estimating method according to the first basic construction of the present invention, the step of correcting the position on the basis of the primary motion vector may move the primary motion vector or the search area to the inside of the reference screen so that a projecting part of the search area for primary motion vectors or candidate block is located inside of the boundary of the reference screen when the projecting part projects outwardly from the boundary of the reference screen.

In the motion vector estimating method according to the first basic construction of the present invention, the step of correcting the position on the basis of the primary motion vector may move the primary motion vector or the search area to the inside of the reference screen by extending the search area or the candidate block inside of the reference screen by pixels corresponding to a projecting part of the search area for primary motion vectors or candidate block, and thereafter, by removing the projecting part, when the projecting part of the search area for primary motion vectors or candidate block projects outwardly from the boundary of the reference screen.

In the motion vector estimating method according to the first basic construction of the present invention, the primary motion vector may be obtained with a precision of one pixel, and the secondary motion vector or the desired motion vector may be obtained with a precision of half pixels.

The motion vector estimating method according to the first basic construction of the present invention may further comprise a step of variable-length-coding image data by utilizing the desired motion vector.

A motion vector estimating system according to a second basic construction of the present invention comprises: a primary motion vector estimating part for obtaining the correlation between a coded block occupying an optional area on a screen of a coded current image, and a plurality of candidate blocks which exist in a search area having an optional size on a screen of a reference image temporally different from the current image and which occupies the same area as that of the coded block, to select a candidate block having the highest correlation from the plurality of candidate blocks to obtain a displacement at that time as a primary motion vector; a primary motion vector position determining part for determining a secondary search area on the basis of the primary motion vector to estimate a positional relationship between a plurality of candidate blocks, which occupy the same area as that of the coded block existing in the determined secondary search area, or the primary motion vector and the reference screen to determine whether the secondary search area or the secondary candidate block is positioned outside of the boundary of the reference screen; a primary motion vector position correcting part for correcting the position on the basis of the primary motion vector so that the secondary search area or the secondary candidate block is located inside of the boundary of the reference screen, when it is determined that a part of the secondary search area or secondary candidate block is positioned outside of the boundary; a secondary motion vector estimating part for obtaining the correlation between the plurality of corrected secondary candidate blocks, which exist in the corrected secondary search area based on the motion vector, the position of which has been corrected, and which occupy the same area as that of the coded block, and the coded block, to select a secondary candidate block having the highest correlation from the plurality of secondary candidate blocks to obtain a displacement at that time as a secondary motion vector; and a desired motion vector estimating part for obtaining a desired motion vector on the basis of the primary motion vector, the correction quantity and the secondary motion vector.

In the motion vector estimating system according to the second basic construction of the present invention, the primary motion vector position correcting part may move the primary motion vector or the search area to the inside of the reference screen so that a projecting part of the search area for primary motion vectors or candidate block is located inside of the boundary of the reference screen when the projecting part projects outwardly from the boundary of the reference screen.

In the motion vector estimating system according to the second basic construction of the present invention, the primary motion vector position correcting part may move the primary motion vector or the search area to the inside of the reference screen by extending the search area or the candidate block inside of the reference screen by pixels corresponding to a projecting part of the search area for primary motion vectors or candidate block, and thereafter, by removing the projecting part, when the projecting part of the search area for primary motion vectors or candidate block projects outwardly from the boundary of the reference screen.

A computer program including motion vector estimating procedures according to a third basic construction of the present invention, comprise: a procedure for obtaining the correlation between a coded block occupying an optional area on a screen of a coded current image, and a plurality of candidate blocks which exist in a search area having an optional size on a screen of a reference image temporally different from the current image and which occupies the same area as that of the coded block; a procedure for selecting a candidate block having the highest correlation from the plurality of candidate blocks to obtain a displacement at that time as a primary motion vector; a procedure for determining a secondary search area on the basis of the primary motion vector to estimate a positional relationship between a plurality of candidate blocks, which occupy the same area as that of the coded block existing in the determined secondary search area, or the primary motion vector and the reference screen to determine whether the secondary search area or the secondary candidate block is positioned outside of the boundary of the reference screen; a procedure for correcting the position on the basis of the primary motion vector so that the secondary search area or the secondary candidate block is located inside of the boundary of the reference screen, when it is determined that a part of the secondary search area or secondary candidate block is positioned outside of the boundary; a procedure for obtaining the correlation between the plurality of corrected secondary candidate blocks, which exist in the corrected secondary search area based on the motion vector, the position of which has been corrected, and which occupy the same area as that of the coded block, and the coded block; a procedure for selecting a secondary candidate block having the highest correlation from the plurality of secondary candidate blocks to obtain a displacement at that time as a secondary motion vector; and a procedure for obtaining a desired motion vector on the basis of the primary motion vector, the correction quantity and the secondary motion vector.

In the above-described first through third basic constructions, there are described a motion vector estimation method, system and program in which the desired motion vector is obtained by using the primary and secondary motion vectors and respective moving (correction) quantities thereof. However, the present invention can be applied to entire motion vector estimation method, system and program in which a desired motion vector is obtained by using one through n (n is a positive and integer number) motion vector (vectors) and respective moving (correction) quantities thereof.

For example, even though the desired motion vector is obtained by the primary and secondary motion vectors in the first though third constructions, a desired motion vector may be obtained as follows:

At first, a secondary motion vector is obtained from a primary motion vector and primary correction quantity, a tertiary motion vector is second obtained from the secondary motion vector and secondary correction quantity in the same manner as that of the secondary motion vector, . . . , an i motion vector (1<i<=n) is obtained from an (i−1)-th motion vector and (i−1)-th correction quantity in the same manner as that of the former motion vector, . . . , and an n motion vector is obtained from an (n−1)-th motion vector and (n−1)-th correction quantity in the same manner as that of the former motion vector. Finally, a desired motion vector is obtained from the primary through (n−1)-th motion vectors, the primary through (n−1)-th correction quantity and the n-th motion vector.

BRIEF DESCRIPTION OF THE DRAWINGS

In the drawings:

FIG. 3A is a table of a reference image for use in a block matching operation in a primary motion vector estimation, and FIG. 3B is a table for use in a coded macro block;

DESCRIPTION OF THE PREFERRED EMBODIMENTS

Referring now to the accompanying drawings, the preferred embodiments of a motion vector estimating system and method and a recording medium in which a motion vector estimating procedure has been recorded, according to the present invention, will be described below in detail.

Figure 1:
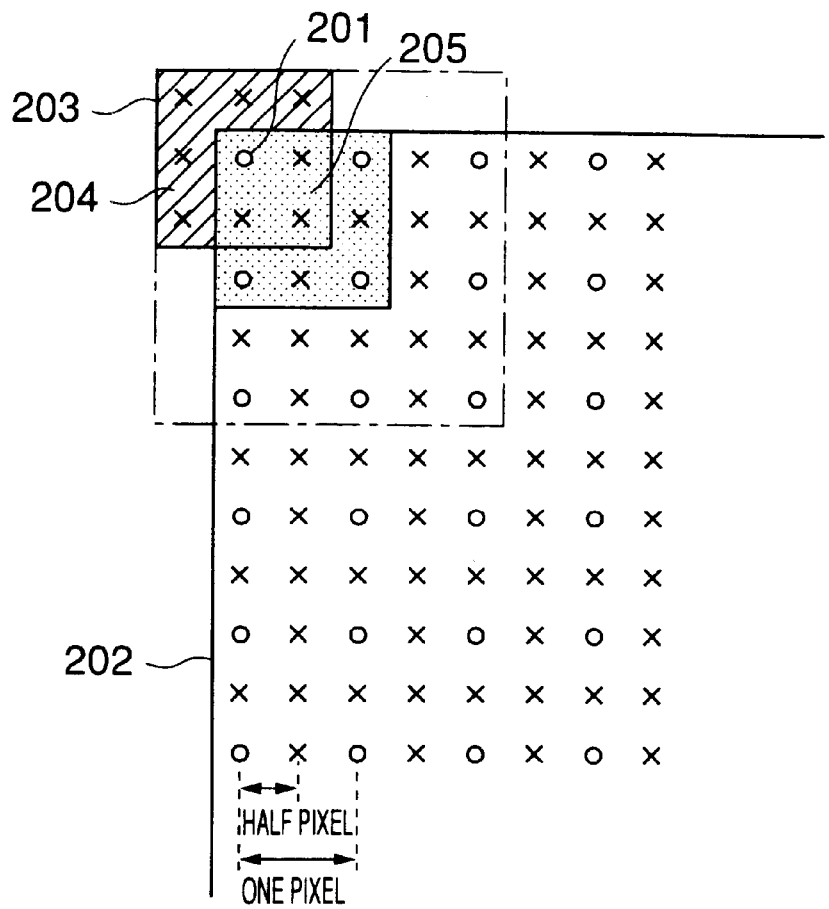
FIG. 1 is a schematic diagram for explaining the decrease of the number of candidate motion vectors with a precision of half pixels in a conventional motion vector estimating system when a motion vector with a precision of one pixel indicates the upper left corner of a reference screen.
Figure 2:
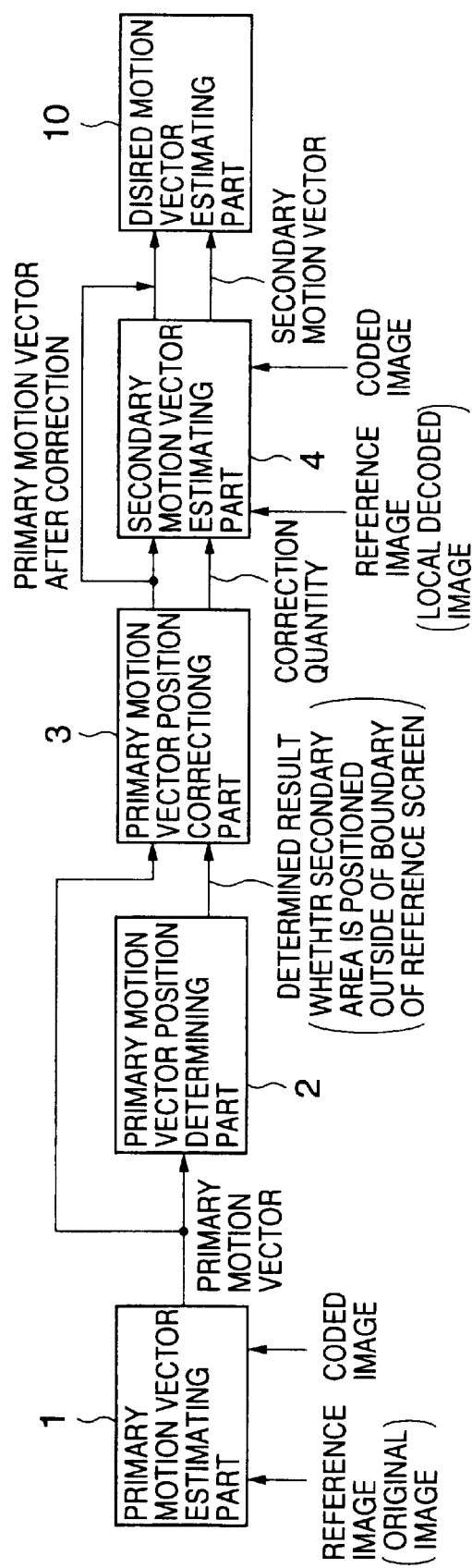
FIG. 2 is a block diagram showing a preferred embodiment of a motion vector estimating system and method according to the present invention.

FIG. 2 is a block diagram showing the construction of the first preferred embodiment of a motion vector estimating system according to the present invention. In this figure, the motion vector estimating system comprises: a primary motion vector estimating part 1 for inputting a reference image (the original image) and a coded image to estimate a primary motion vector; a primary motion vector position determining part 2 for determining the position of the primary motion vector, which is outputted from the estimating part 1, to output position information indicating whether the position of the primary motion vector contacts the upper, lower, left or right side of a reference screen; a primary motion vector correcting part 3 for carrying out a primary motion vector correction on the basis of the primary motion vector, which is outputted from the estimating part, and the position information, which is outputted from the determining part 2, to output a corrected primary vector and its correction quantity; a secondary motion vector estimating part 4 for inputting a reference image (a local decoded image) and a coded image on the basis of the corrected primary motion vector and correction quantity, which are outputted from the correcting part 3, to output a secondary motion vector; and a motion vector synthesizing part 10 for adding the primary motion vector, the primary motion vector correction quantity and the secondary motion vector to obtain a desired motion vector.

In the preferred embodiments which will be described later, there will be described an example of a case where a primary motion vector estimation is carried out with a precision of one pixel and a secondary motion vector estimation is carried out with a precision of half pixels. The pixel precision in the motion vector estimation should not be limited to these values. The present invention can be carried out even if other pixel precisions are combined in the primary and secondary motion vector estimations.

The primary motion vector estimating part 1 is designed to carry out a motion vector estimation with a precision of one pixel which uses the original image as a reference image. The correlation between a coded block having a certain size on a coded image (the current image) and a plurality of candidate blocks having the same size as that of a coded block located within a predetermined search area on the reference image is obtained. At this time, for example, a table wherein the absolute value of difference between pixels arranged at the same positions of the coded block and the candidate block is added with respect to all of pixels in the blocks may be used as an index indicative of the correlation.

As a formula for obtaining the sum of the absolute values of differences between coded macro blocks having a certain size and reference image macro blocks having the same size as the size of the coded macro block, the following formula can be expressed. In a case where a macro block size serving as an object to be operated is an 8×8 pixel, the sum of differential absolute values AE (h,v) of a matching block with respect to a certain pixel (h,v) on a reference image can be expressed as follows.

$$AE(h, v) = \sum (i = 0 \sim 7) \sum (j = 0 \sim 7)$$
$$|refDat(h + i, v + j) - CurMBDat(i, j)|$$

wherein RefDat (i,j) denotes reference image macro block data, and CurMBDat (i,j) denotes coded macro block data. For example, the reference image macro block has a positional relationship shown in FIG. 3A, and the coded macro block has a positional relationship shown in FIG. 3B.

From the sums of the differential absolute values with respect to each block, which are obtained by a block matching operation, the minimum sum is selected. When the values are equal to each other, the order of precedence is determined in view of, e.g., the distance of a matching point (a candidate motion vector point) from the center of a set area, to select the optimum block. The candidate motion vector point located within the selected block is used as a primary motion vector.

As described above, the candidate block having the highest correlation with the coded block is estimated, so that the upper left pixel position of the candidate block is estimated as a candidate motion vector. Furthermore, it is assumed that the reference image appears before the current image in the meaning of the coding order although the reference image appears temporally before and after the current image in the meaning of the image reproducing order.

The primary motion vector position determining part 2 will be described below. The determining part 2 is designed to determine whether the secondary search area or secondary candidate block on the basis of the motion vector with a precision of one pixel is outside of the boundary of the reference image, and serves as the most characteristic construction and operation of the present invention. It is estimated whether an optional side of the secondary candidate block determined on the basis of the primary motion vector estimated by the primary motion vector estimating part 1 is outside of the boundary of the reference screen. If it is outside of the boundary, it is also estimated whether any one of the upper, lower, left and right sides contacts the boundary. Subsequently, the motion vector is corrected with a precision of half pixels in accordance with the respective cases. Furthermore, the horizontal right direction on the screen is plus, and the vertical lower direction is plus.

That is, when a frame motion vector is estimated, e.g., if it is assumed that 9 pixels located within an area of ±1 in horizontal and vertical directions about a primary motion vector with a precision of half pixels are secondary candidate motion vectors, the correction quantity is +1 (right direction) in horizontal directions with a precision of half pixels when the side being outside of the boundary of the reference screen is the left side of a secondary candidate block, the correction quantity is +1 (left direction) in vertical directions when the side being outside of the boundary of the reference screen is the upper side of the being outside of the boundary of candidate block, the correction quantity is −1 (left direction) in horizontal directions when the side being outside of the boundary of the reference screen is the right side of the being outside of the boundary of candidate block, and the correction quantity is −1 (upper direction) in vertical directions when the side being outside of the boundary of the reference screen is the lower side of the candidate block.

Figure 4:
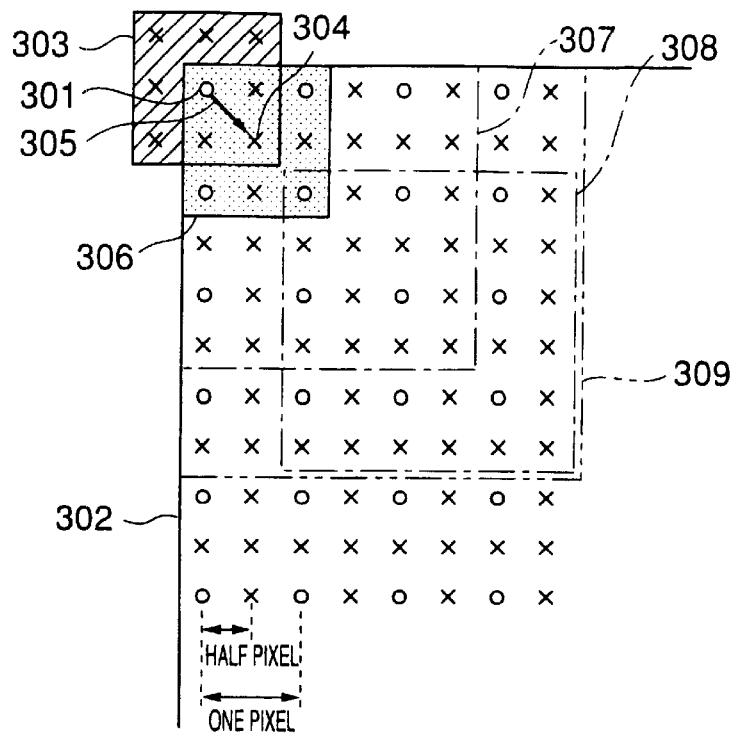
FIG. 4 is a schematic diagram for explaining a correction method when a frame motion vector with a precision of one pixel indicates the upper left corner of a reference screen.

For example, as shown in FIG. 4, if the motion vector with a precision of one pixel exists in the uppermost leftmost portion of the reference screen, a correction is carried out as shown by arrow 305. FIG. 4 is a schematic diagram for explaining how to correct when the primary motion vector with a precision of one pixel indicates the upper left end of the reference screen. A motion vector 301 with a precision of one pixel denotes a corner of a boundary 302 of the reference screen. Assuming that the motion vector 301 is the center of search, candidate motion vectors with a precision of half pixels are shown by ○ and X in an area surrounded by the solid line in the figure. If this area is moved by +1 in horizontal and vertical directions, respectively, the candidate motion vectors with a precision of half pixels are located inside of the boundary 302 of the reference screen. Furthermore, an area surrounded by the two-dot chain line is a motion vector search area on the reference screen.

A corrected motion vector 304 with a precision of one pixel has been corrected by arrow 305. If the corrected motion vector 304 is used as the center of search in the motion vector estimation with a precision of half pixels, the candidate motion vectors with a precision of half pixels are located within an area 306. Reference number 307 denotes a candidate block having an upper left candidate motion vector with a precision of half pixels in the area 306 as an upper left pixel, and reference number 308 denotes a candidate block having a lower right candidate motion vector with a precision of half pixels in the area 306 as an upper left pixel. The size of the candidate blocks 307 and 308 is 6 in horizontal directions and 6 in vertical directions, with a precision of half pixels.

Figure 5:
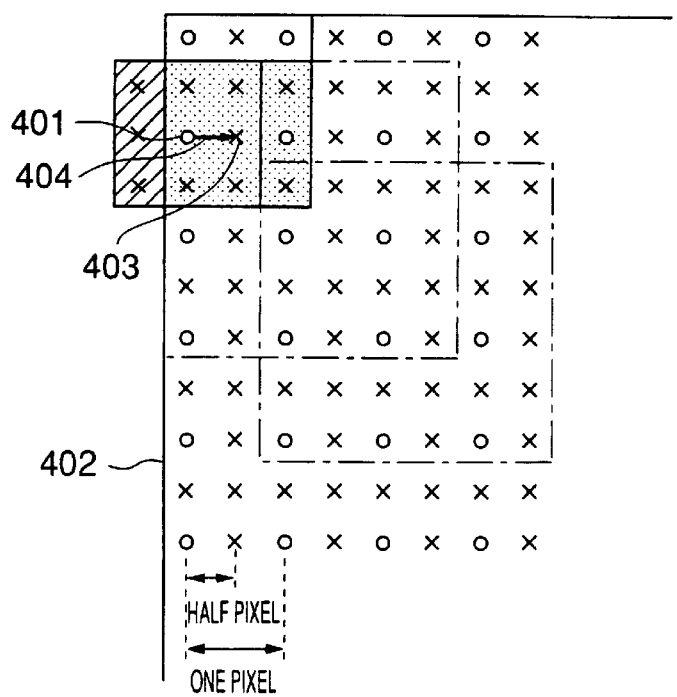
FIG. 5 is a schematic diagram for explaining a correction method when a frame motion vector with a precision of one pixel indicates the left end of a reference screen.

As shown in FIG. 5, if the primary motion vector with a precision of one pixel indicates the left end of the reference screen, a correction is carried out as shown by arrow 404. A motion vector 401 with a precision of one pixel indicates the first column on the third row. If this motion vector 401 is used as the center of search for forming an area of 9 pixels, three pixels project from a boundary 402. Therefore, a correction shown by arrow 404 is carried out to set a set area of secondary candidate motion vector points with a precision of half pixels about a corrected motion vector 403 with a precision of one pixel. A candidate block having candidate motion vectors with a precision of half pixels on the upper left of the set area of the candidate points as upper left pixels, and a candidate block having candidate motion vectors with a precision of half pixels on the lower right of the set area of the candidate points as upper left pixels are shown by chain lines, respectively.

Figure 6:
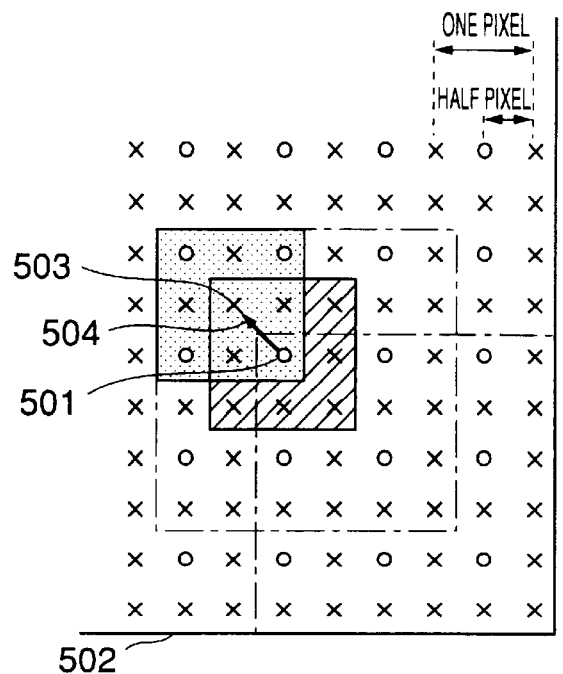
FIG. 6 is a schematic diagram for explaining a correction method when a frame motion vector with a precision of one pixel indicates the lower right corner of a reference screen.

As shown in FIG. 6, if a primary motion vector with a precision of one pixel indicates the lower right end of the reference screen, a correction shown by arrow 504 is carried out. That is, a candidate block for candidate motion vectors with a precision of half pixels comprises 6 pixels×6 pixels in horizontal and vertical directions, respectively, which include candidate motion vectors with a precision of half pixels on the lower right of the set area of candidate points as upper left pixels, so that it is required to carry out the correction shown by arrow 504 when a motion vector 501 serving as the center of search is located on the sixth column from the right end and on the sixth row from the bottom end.

If the motion vector 501 indicates the position shown in FIG. 6, the candidate block with a precision of half pixels projects from a boundary 502 of the reference screen in a search area using the motion vector 501 as the center of search. Therefore, if one correction is carried out in horizontal and vertical directions, respectively, the search area moves as shown in FIG. 6. If a candidate motion vector block is set with respect to 9 pixels about the corrected primary motion vector, a candidate block having candidate motion vectors on the upper left of the set area of candidate points as upper left pixels, and a candidate block having candidate motion vectors on the lower right of the set area of candidate points as upper left pixels are ranges shown by chain lines in FIG. 6, respectively.

As described above, even if the primary motion vector with a precision of one pixel indicates any places in the vicinity of the boundary of the reference screen, if the search area is corrected so that the candidate block is located within the reference screen, it is possible to surely estimate motion vectors without deteriorating the precision of estimation of the motion vectors. While the upper, lower and right sides and the upper right corner and lower left corner have not been shown and described, the same correction as those of the left side described referring to FIG. 5, the upper left corner described referring to FIG. 4, and the lower right corner described referring to FIG. 6 are carried out.

While the estimation of frame motion vectors has been described, the estimation of motion vectors may be carried out on a field edge. When a field motion vector is estimated, e.g., if it is assumed that 15 pixels located within an area of ±2 in horizontal directions and ±1 in vertical directions with a precision of half pixels about a primary motion vector are secondary candidate motion vector points, the correction quantity is +2 (right direction) in horizontal directions when the side contacting the reference screen is the left side of a candidate block, the correction quantity is +1 (lower direction) in vertical directions when the side contacting the reference screen is the upper side of the candidate block, the correction quantity is −2 (left direction) in horizontal directions when the side contacting the reference screen is the right side of the candidate block, and the correction quantity is −1 (upper direction) in vertical directions when the side contacting the reference screen is the lower side of the candidate block.

Figure 7:
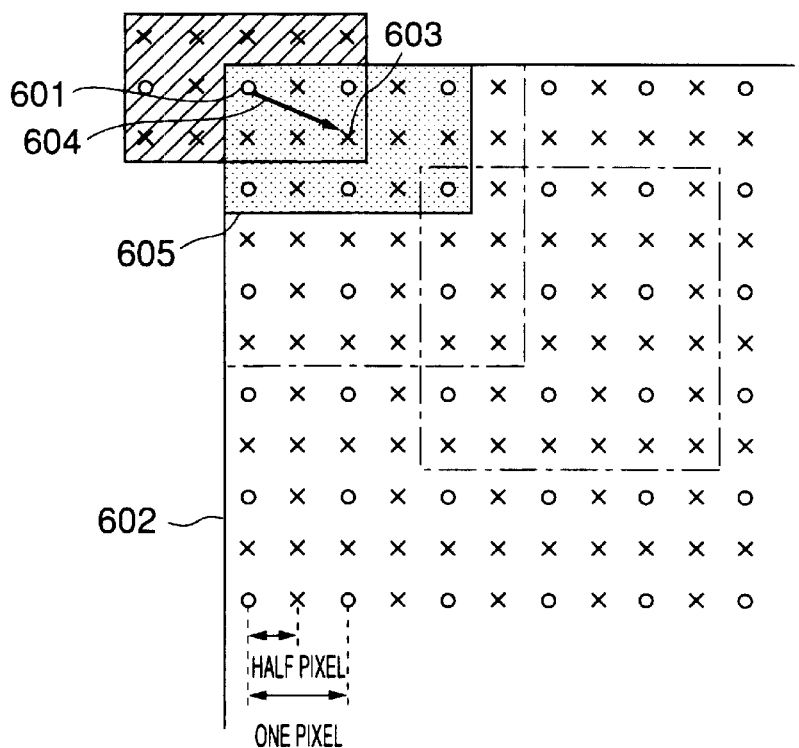
FIG. 7 is a schematic diagram for explaining a correction method when a field motion vector with a precision of one pixel indicates the upper left corner of a reference screen.

For example, if the motion vector with a precision of one pixel exists in the uppermost leftmost corner of the reference screen, a correction is carried out as shown by arrow 604 in FIG. 7. Since a motion vector 601 indicates the uppermost leftmost corner with respect to a boundary 602 of the upper and left sides of the reference screen, the first row from the top and two columns from the left in the area using the motion vector 601 as the center of search project from the boundary 602. Therefore, if a correction of +2 in horizontal directions and +1 in vertical directions is carried out so that the search area is located inside of the boundary 602, all of candidate blocks can be put in the reference screen when a motion vector estimation with a precision of half pixels is carried out. Furthermore, while the number of candidate motion vectors has been 9 pixels during the estimation of a frame motion vector and while the number of candidate motion vectors has been 15 pixels during the estimation of a field motion vector, the number of candidate motion vectors may be 15 pixels during the estimation of a frame motion vector, and the number of candidate motion vectors may be 9 pixels during the estimation of a field motion vector. Alternatively, other optional numbers of candidate motion vectors may be used, respectively.

Since the correction quantity obtained herein can be used for assigning the order of preference during the estimation of a secondary motion vector, the correction quantity, together with the corrected motion vector, is transmitted to a secondary motion vector estimating block.

A procedure for determining the position of a primary motion vector will be described below. The position of a motion vector is determined using the coordinates of a primary motion vector, the coordinates of the size of a set area of secondary candidate motion vector points, and the size of a candidate block of secondary motion vectors. The unit of the coordinates is i pixels or 1/i pixels (ii is a positive integer). If the frame size of the reference screen is expressed by coordinates, the coordinates of the uppermost leftmost portion are (horizontal, vertical)=(Hmin, Vmin), the coordinates of the lowermost rightmost portion are (horizontal, vertical)=(Hmax, Vmax), and the coordinates of the primary motion vector are (horizontal, vertical)=(Hmv, Vmv). In this case, it is determined whether each of the following conditions is satisfied.

If $\Delta x1 = Hmin + x - Hmv$ is positive, a part of the left side of the leftmost secondary candidate block is outside of the reference screen. If $\Delta x2 = Hmv + x + (m-1) - Hmax$ is positive, a part of the right side of the rightmost secondary candidate block is outside of the reference screen. If $\Delta y1 = Vmin + y - Vmv$ is positive, a part of the upper side of the uppermost secondary candidate block is outside of the reference screen. If $\Delta y2 = Vmv + y + (n-1) - Vmax$ is positive, a part of the lower side of the lower side of the lowermost secondary candidate block is outside of the reference screen. The size of the candidate block is an area of m coordinate in horizontal directions and n coordinate in vertical directions. The coordinates of secondary candidate motion vector points are expressed by a set of points in the range of $-x, -(x-1), \ldots, -1, 0, 1, \ldots, x-1$ and x in horizontal directions and in the range of $-y, -(y-1), \ldots, -1, 0, 1, \ldots, y-1$ and y in vertical directions, about the point of a primary motion vector using positive integers x and y. The Hmax and Vmax are positive integers.

The primary motion vector correction is carried out on the basis of the determined results of the position of the primary motion vector so that all of candidate blocks are put in the screen during the secondary motion vector estimation. That is, as described above, with respect to the motion vectors wherein the candidate motion vector block projects from the boundary of the outer peripheral side of the reference screen, a correction is carried out so that all of candidate blocks are located inside of the boundary of the reference screen. Using coordinates as examples, the correction carried out at this time will be described.

For example, if the left side of the leftmost secondary candidate block projects outwardly from the left side of the reference screen, a correction of $+\Delta x1$ is carried out in horizontal directions, and if the right side of the rightmost secondary candidate block projects outwardly from the right side of the reference screen, a correction of $-\Delta x2$ is carried out in horizontal directions. In addition, if the upper side of the uppermost secondary candidate block projects outwardly from the upper side of the reference screen, a correction of $+\Delta y1$ is carried out in vertical directions, and if the lower side of the lowermost secondary candidate block projects outwardly from the lower side of the reference screen, a correction of $-\Delta y2$ is carried out in vertical directions. Furthermore, the correction quantities $\Delta x1$, $\Delta x2$, $\Delta y1$ and $\Delta y2$ are quantities which are expressed as follows and which are used when the position of the primary motion vector is determined.

$\Delta x1 = Hmin + x - Hmv$
$\Delta x2 = Hmv + x + (m-1) - Hmax$
$\Delta y1 = Vmin + y - Vmv$
$\Delta y2 = Vmv + y + (n-1) - Vmax$ When the correction is carried out, i.e., when the candidate block projects outwardly from the reference image, the corresponding correction quantity is a positive integer.

For example, if the left side of the secondary candidate block on the leftmost side is outside of the left side of the reference screen, the coordinates of the corrected motion vector are $(Hmv+\Delta x1, Vmv)$, and if the left and upper sides of the secondary candidate block on the leftmost side are outside of the left and upper sides of the reference screen, the coordinates of the corrected motion vector are $(Hmv+\Delta x1, Vmv+\Delta y1)$. In addition, if the right and lower sides of the secondary candidate block on the rightmost side are outside of the right and lower sides of the reference screen, the coordinates of the corrected motion vector are $(Hmv-\Delta x2, Vmv+\Delta y2)$. It is herein assumed that the coordinates of secondary candidate motion vector points are expressed by a set of points in the range of $-x, -(x-1), \ldots, -1, 0, 1, \ldots, x-1$ and x in horizontal directions and in the range of $-y, -(y-1), \ldots, -1, 0, 1, \ldots, y-1$ and y in vertical directions, about the point of a primary motion vector.

The operation of the secondary motion vector estimating part 4 will be described below. In the secondary motion estimation, a motion vector estimation with a precision of half pixels is carried out using a local decoded image as a reference image. The correlation between a coded block having a size existing in a coded image (the current image) and a plurality of candidate blocks having the same size as that of the coded block located within a search area which is set by the corrected motion vector with a precision of one pixel is obtained. At this time, for example, it is possible to use the same method as that used during the primary motion vector estimation.

By using the correction quantity transmitted from the primary motion vector correcting part 3, the order of preference can be assigned when the original primary motion vector with a precision of one pixel is the center of search. A block having the highest correlation with the coded block is obtained from all of candidate blocks, and the position of the upper left pixel of the candidate block is estimated as a motion vector.

The search area in the motion vector estimation is obtained as a set of candidate blocks wherein the point shifted with a precision of half pixels by an optional combination about the corrected motion vector with a precision of one pixel as follows includes the upper left pixel. That is, it is assumed that the point is shifted by displacements of $-1$, 0 and $+1$ in vertical and horizontal directions, respectively, during the frame motion vector estimation, and by displacements of −1, 0 and +1 in vertical directions and −2, −1, 0, +1 and +2 in horizontal directions during the field vector estimation.

Finally, without the influence of the position in the reference screen of the motion vector with a precision of one pixel obtained by the primary motion vector estimation, the candidate block (i.e., the candidate motion vectors with a precision of half pixels) of 9 pixels is always located within the search area in the case of the frame motion vector estimation, and the candidate block of 15 pixels is always located within the search area in the case of the field motion vector estimation, so that it is possible to estimate motion vectors with a precision of half pixels from the candidate block. Specifically, 9 motion vectors in the area 306 of FIG. 4 are estimated in the case of the frame motion vector estimation, and 15 motion vectors in the area 605 of FIG. 7 are estimated.

Using the above described x and y, the secondary motion vector estimated by the secondary motion vector estimating part 4 are obtained by carrying out a block matching operation using $\{(2x+1)\times(2y+1)\}$ blocks, which comprise (2x+1) blocks in horizontal directions by (2Y+1) blocks in vertical directions about the primary motion vector, as a matching point. The block matching operation and the minimum value determination may be carried out in the same manner as that in the primary motion vector estimation.

Figure 8:
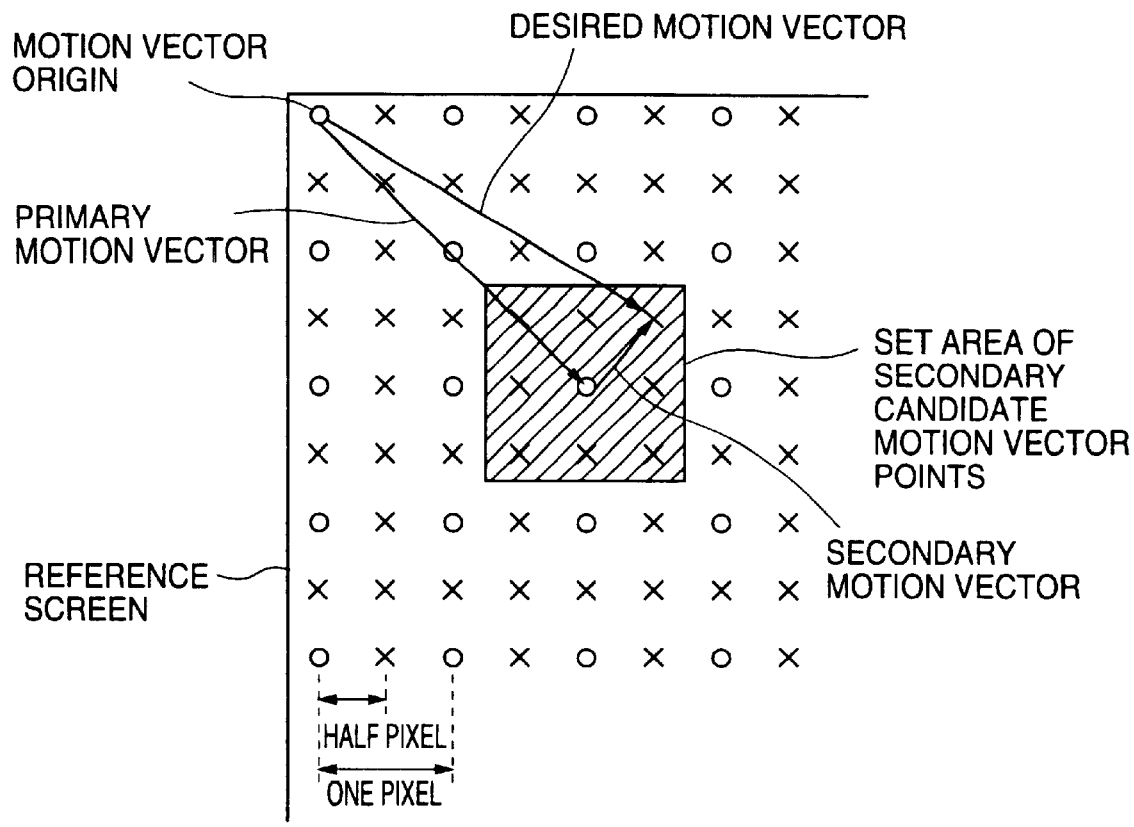
FIG. 8 is a schematic diagram for explaining an operation when a set area of secondary candidate motion vector points is located inside of the boundary of a reference screen.
Figure 9:
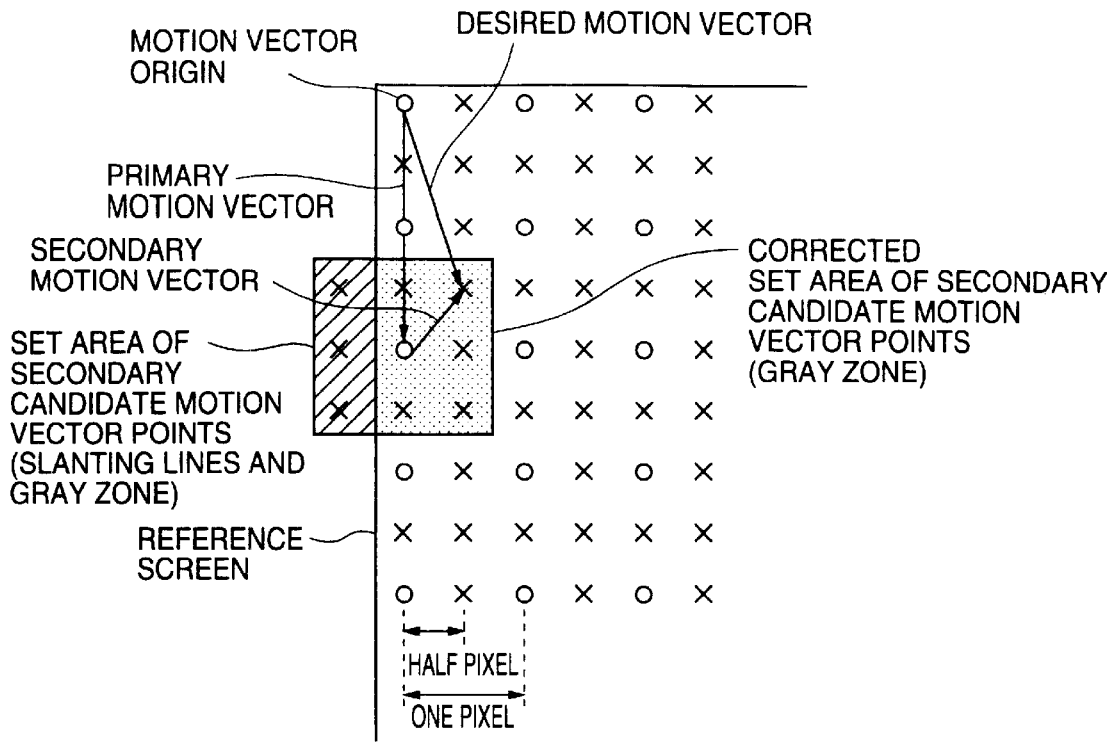
FIG. 9 is a schematic diagram for explaining a correction method using a conventional technique when a frame motion vector with a precision of one pixel indicates the left end of a reference screen.
Figure 10:
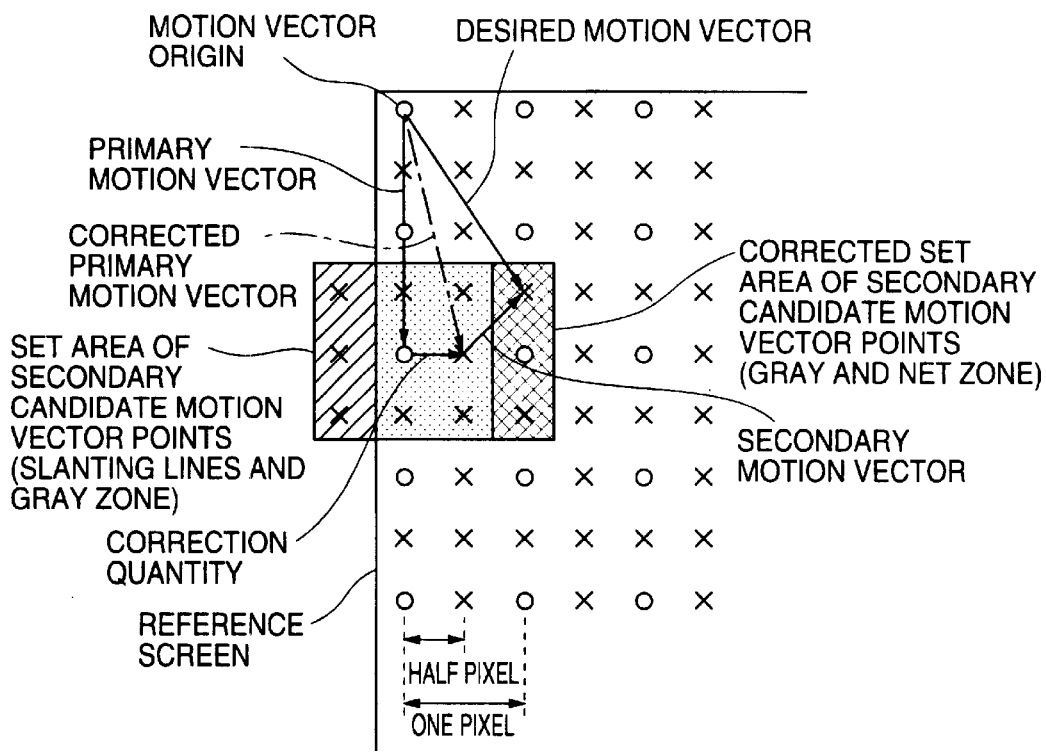
FIG. 10 is a schematic diagram for explaining a correction method using a technique according to the present invention when a frame motion vector with a precision of one pixel indicates the left end of a reference screen.

Referring to FIGS. 8 through 10, there will be described a case where all of candidate blocks do not project outwardly from the range of the reference screen and a case where a part of all of candidate blocks project outwardly from the reference screen, when the primary and secondary motion vector estimations are thus carried out to find a desired motion vector.

As shown in FIG. 8, when all of candidate blocks do not project outwardly from the reference screen, a primary motion vector shown by arrow is obtained with respect to the motion vector origin. Then, a set area of secondary candidate motion vector points is set about a pixel shifted by the primary motion vector to obtain a secondary motion vector, so that a motion vector from the motion vector origin to a pixel shifted by the secondary motion vector is obtained as a desired motion vector. Thus, when all of candidate blocks are completely located within the reference screen, the desired motion vector can be obtained by the method shown in FIG. 8 in either case of the conventional technique and the technique of the present invention.

On the other hand, when a part of all of candidate blocks project outwardly from the reference screen, the conventional technique shown in FIG. 9 is different from the technique of the present invention shown in FIG. 10. In the case of FIGS. 9 and 10 wherein the primary motion vector obtained from the motion vector origin existing at the upper left corner extends along the left side, a set area of secondary candidate motion vector points projects from the left side of the reference screen. At this time, since a portion defined by slanting lines projecting from the left side of the reference screen is omitted from candidates, a secondary motion vector is obtained as a motion vector with respect to a pixel in the set area of candidate points, so that a desired motion vector is also obtained as a motion vector extending from the motion vector origin toward a pixel to which the secondary motion vector moves, as shown in FIG. 9.

In the technique of the present invention, after the primary motion vector from the motion vector origin is obtained, a correction quantity is obtained, and the corrected primary motion vector is obtained on the basis of the correction quantity. Then, as shown in FIG. 10, a corrected set area of secondary candidate motion vector points is set about the next pixel to obtain a secondary motion vector from the corrected set area to obtain a desired motion vector as shown in the figure. Thus, it can be seen that the secondary motion vector and desired motion vector, which can be found by the technique of the present invention, can not be estimated by the conventional technique shown in FIG. 9.

Figure 11:
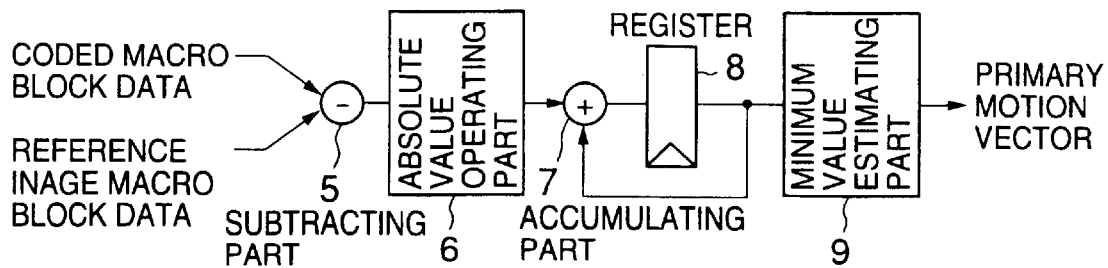
FIG. 11 is a block diagram showing a basic construction of a block matching operation.

FIG. 11 shows the basic construction of a block matching circuit for carrying out a block matching. In FIG. 11, coded macro block data and reference image macro block data are inputted to a subtracting part 5 by which the difference between both data is operated. The output of the subtracting part is inputted to a differential absolute value operating part 6 by which the absolute value of the difference is operated. The output of the absolute value operating part 6 is added by an accumulating part 7 to be temporarily stored in a register 8. The output of the register 8 and the output of the absolute value operating part 6 are sequentially accumulated. The output of the register 8 is fed back to the accumulating part 7 to be sequentially updated, and the minimum value is estimated by a minimum value estimating part 9. This minimum value is outputted from the primary motion vector estimating part 1 of FIG. 2 as a primary motion vector. As described above, the construction of the secondary motion vector estimating part 4 is basically the same as that of the block matching operating part of FIG. 11.

As examples of mounting of the differential absolute value sum operating part 6, there are a systolic array and a construction wherein a plurality of differential absolute values are obtained in parallel to be added at a time. In the systolic array system, operators (processor elements: PEs) capable of carrying out an operation of a differential absolute value between adjacent pixels are arranged in the form of an array so as to match with the size of an image data block or the like. Each PE obtains a differential absolute value between adjacent pixels, and the obtained differential absolute value is added to an accumulated value, which is fed from the adjacent PE, to fed the result to another PE to obtain a motion vector. For example, see Electronic Information Communication Society, Communication Technology Report ED98-52, SDM98-52, ICD98-51 "Development Of One Chip MPEG2, MP@ML, Encoder LSI" by Yamakage et al., particularly FIGS. 8 and 9 disclosed in this paper.

Figure 13:
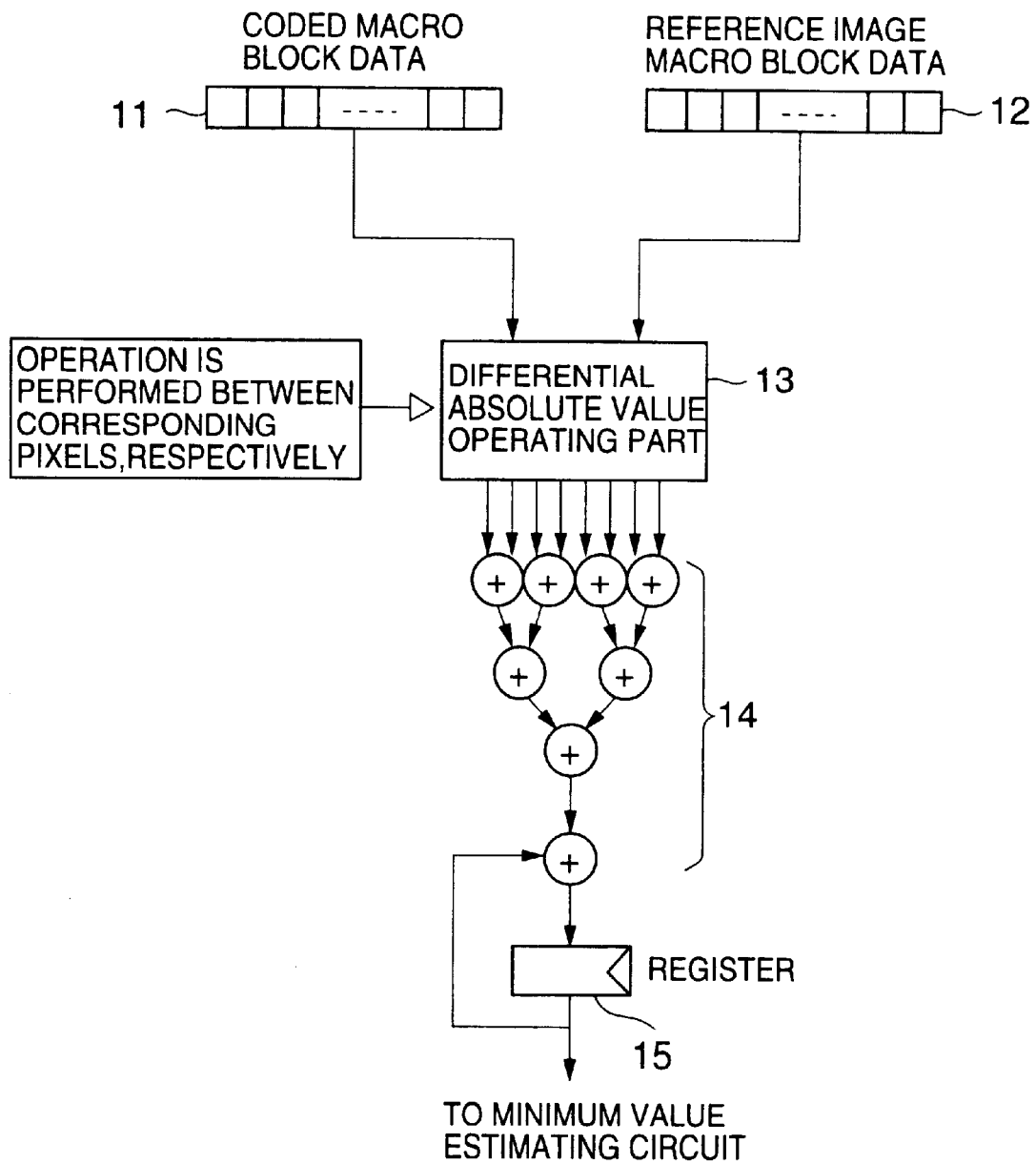
FIG. 13 is a block diagram showing the construction of a differential absolute value operator which operates in parallel.

A second example of mounting of a differential absolute value sum operator is shown in FIG. 13. In an operator 10 shown in FIG. 13, coded macro block data 11 and reference image macro block data 12 are supplied to a differential absolute value operator 13 by which an operation is carried out between corresponding pixels in both data. When the sum of differential absolute values of s pixels arranged in horizontal directions is obtained by the differential absolute value operator 13, and all of the differential absolute values are sequentially added by an adder group 14 to store the result in a register 15.

Figure 12:
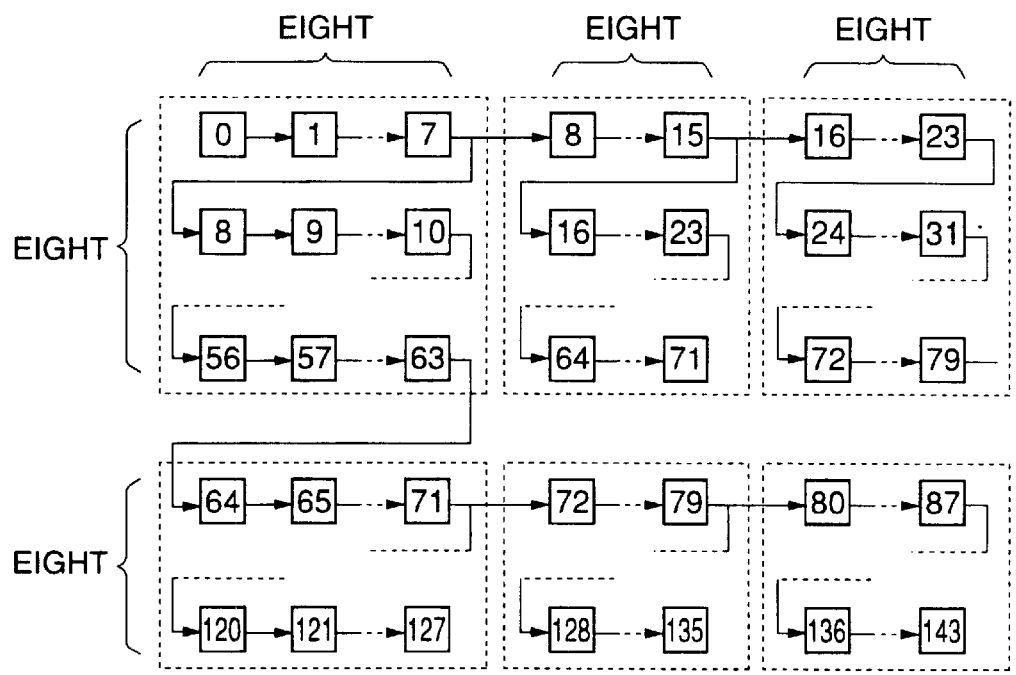
FIG. 12 is a block diagram showing the construction of an operating part (PE) using a systolic array as an example of mounting of a differential absolute value operating part.

The operator 10 can obtain the sum of differential absolute values in a pixel area of "s×t" by repeating operations for t rows in vertical directions. If a plurality of operators with such a construction are mounted to be operated in parallel, block matching operations can be carried out at a plurality of candidate points at a time. The construction of the differential absolute value operator for estimating a motion vector may be any one of the systolic array system shown in FIG. 12 and the operator shown in FIG. 13.

Figure 14:
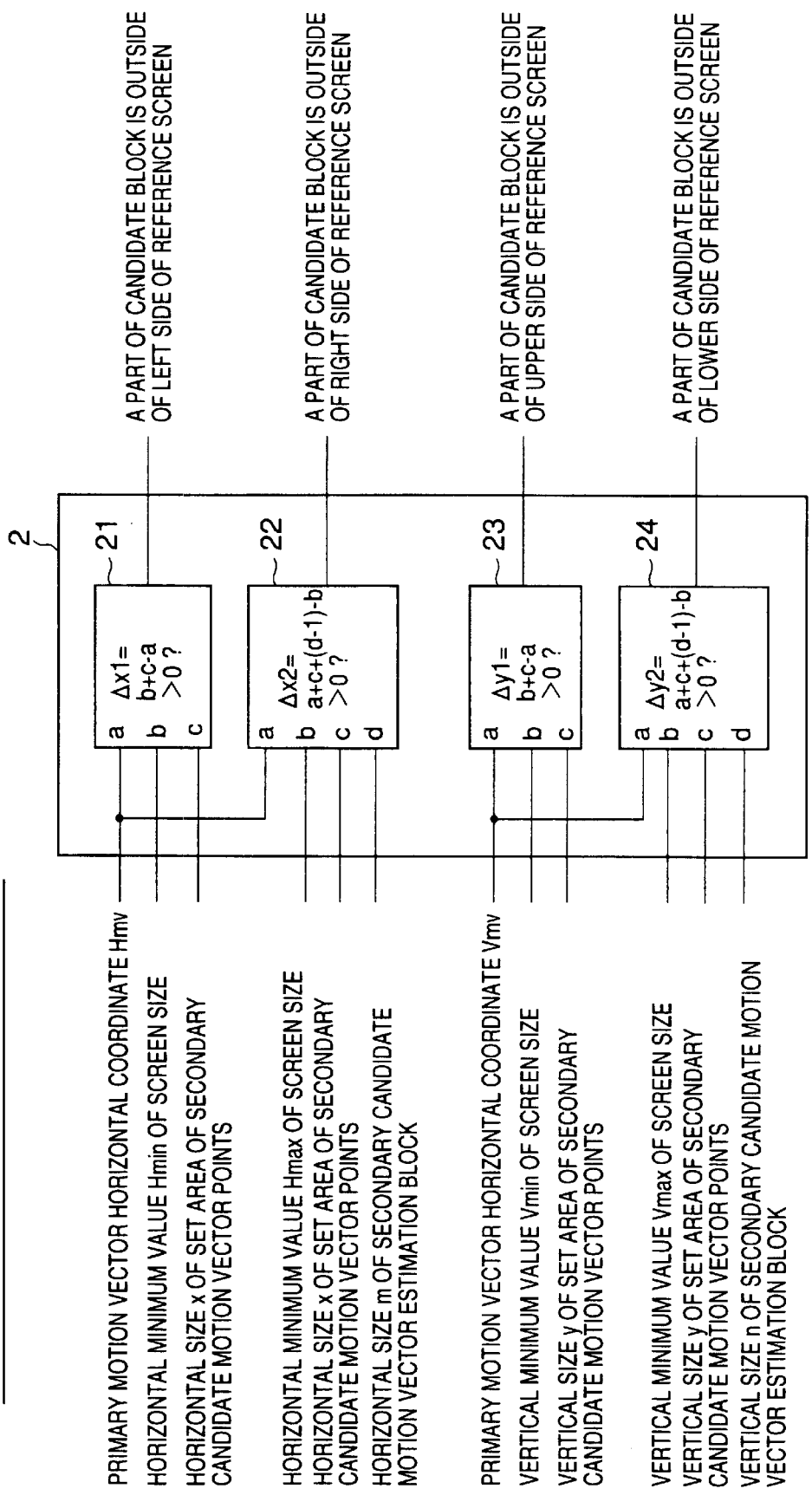
FIG. 14 is a block diagram showing the construction of a preferred embodiment of a primary motion vector position determining part according to the present invention.

Referring to FIG. 14, the detailed construction of the primary motion vector position determining part 2 shown in FIG. 2 will be described below. In FIG. 14, the primary motion vector position determining part 2 comprises first through fourth determining parts 21 through 24 for determining whether a candidate motion vector block is located inside of the boundary of a reference screen. The first determining part 21 receives a primary motion vector horizontal coordinate Hmv, the minimum value Hmin of a screen size, and a horizontal size x of a set area of secondary candidate motion vector points to obtain the above described "$\Delta x1=Hmin+x-Hmv$". If this is positive, the first determining part 21 determines that a part of the candidate block is outside of the left side of the reference screen. The second determining part 22 receives the primary motion vector horizontal coordinate Hmv, the horizontal maximum value Hmax of the size of the reference screen, and the horizontal size x of the set area of the secondary candidate motion vector points to obtain the above described "$\Delta x2=Hmv+x+(m-1)-Hmax$". If this is positive, the second determining part 22 determines that a part of the candidate block is outside of the right side of the reference screen.

Similarly, the third and fourth determining parts 23 and 24 determine whether the candidate motion vector block contacts the upper and lower sides of the reference screen. The third determining part 23 receives a primary motion vector vertical coordinate Vmv, the maximum value Vmin of the screen size, and the vertical size y of the set area of the secondary candidate motion vector points to obtain the above described "$\Delta y1=Vmin+y-Vmv$". If this is positive, the third determining part 23 determines that a part of the candidate block is outside of the upper side of the reference screen. The fourth determining part 24 receives the vertical coordinate of the primary motion vector, the vertical maximum value Vmax of the size of the reference screen, the vertical size y of the set area of the secondary candidate motion vector points, and the vertical size n of the secondary candidate motion vector estimation block to obtain the above described "$\Delta y2=Vmv+y+(n-1)-Vmax$". If this is positive, the fourth determining part 24 determines that a part of the candidate block is outside of the lower side of the reference screen. The detailed constructions of the first through fourth determining parts 21 through 24 may be formed by circuits as hardware, or formed so as to operate by software using a CPU (Central Processing Unit) or an MPU (Macro-Processor Unit).

Figure 15:
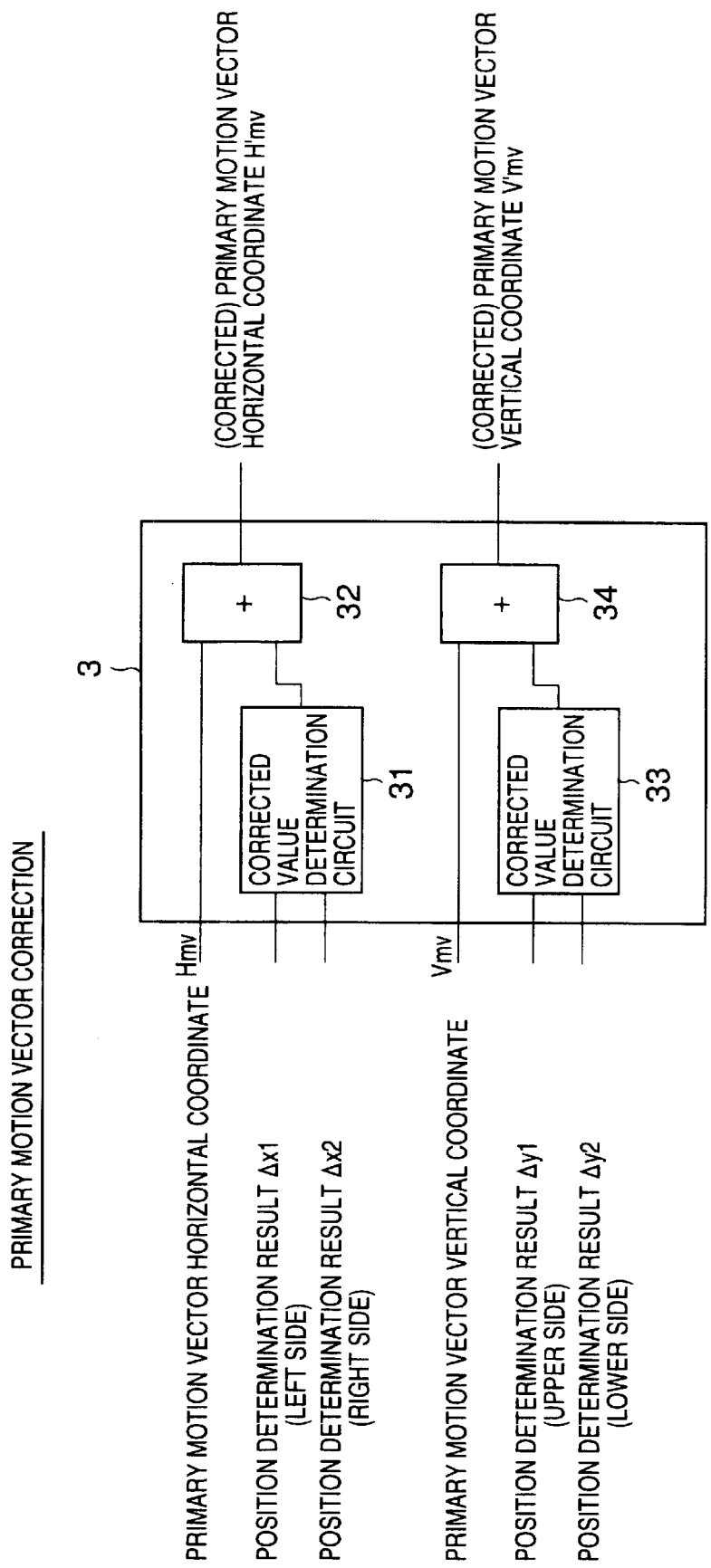
FIG. 15 is a block diagram showing the construction of a preferred embodiment of a primary motion vector correcting part according to the present invention.

The primary motion vector correcting part 3 shown in FIG. 2 has a detailed construction shown in FIG. 15. The primary motion vector correcting part 3 is designed to supply the coordinates of the corrected position on the reference screen to the secondary motion vector estimating part 4 using the results determined by the primary motion vector position determining part 2, and the primary motion vector supplied from the primary motion vector estimating part 1. In FIG. 15, the primary motion vector correcting part 3 comprises: a first correction value determining circuit 31 for inputting the determined results of the first and second determining parts 21 and 22 of the primary motion vector position determining part 2 of FIG. 14 to determine a horizontal correction value; and a first adder circuit 32 for adding the value of the primary motion vector from the primary motion vector estimating part 1 to the output of the correction value determining circuit 31. From the adder circuit 32, a corrected primary motion vector horizontal coordinate H'mv is outputted.

The primary motion vector correcting part 3 comprises: a second correction value determining circuit 33 for inputting the determined results of the third and fourth determining parts 23 and 24 of the primary motion vector position determining part 2 of FIG. 14 to determine a vertical correction value; and a second adder circuit 34 for adding the value of the primary motion vector from the primary motion vector estimating part 1 to the output of the correction value determining circuit 33. From the adder circuit 34, a corrected primary motion vector vertical coordinate V'mv is outputted. Similar to the primary motion vector position determining part 2, the construction of the primary motion vector correcting part 3 may be realized by hardware or software.

Figure 16:
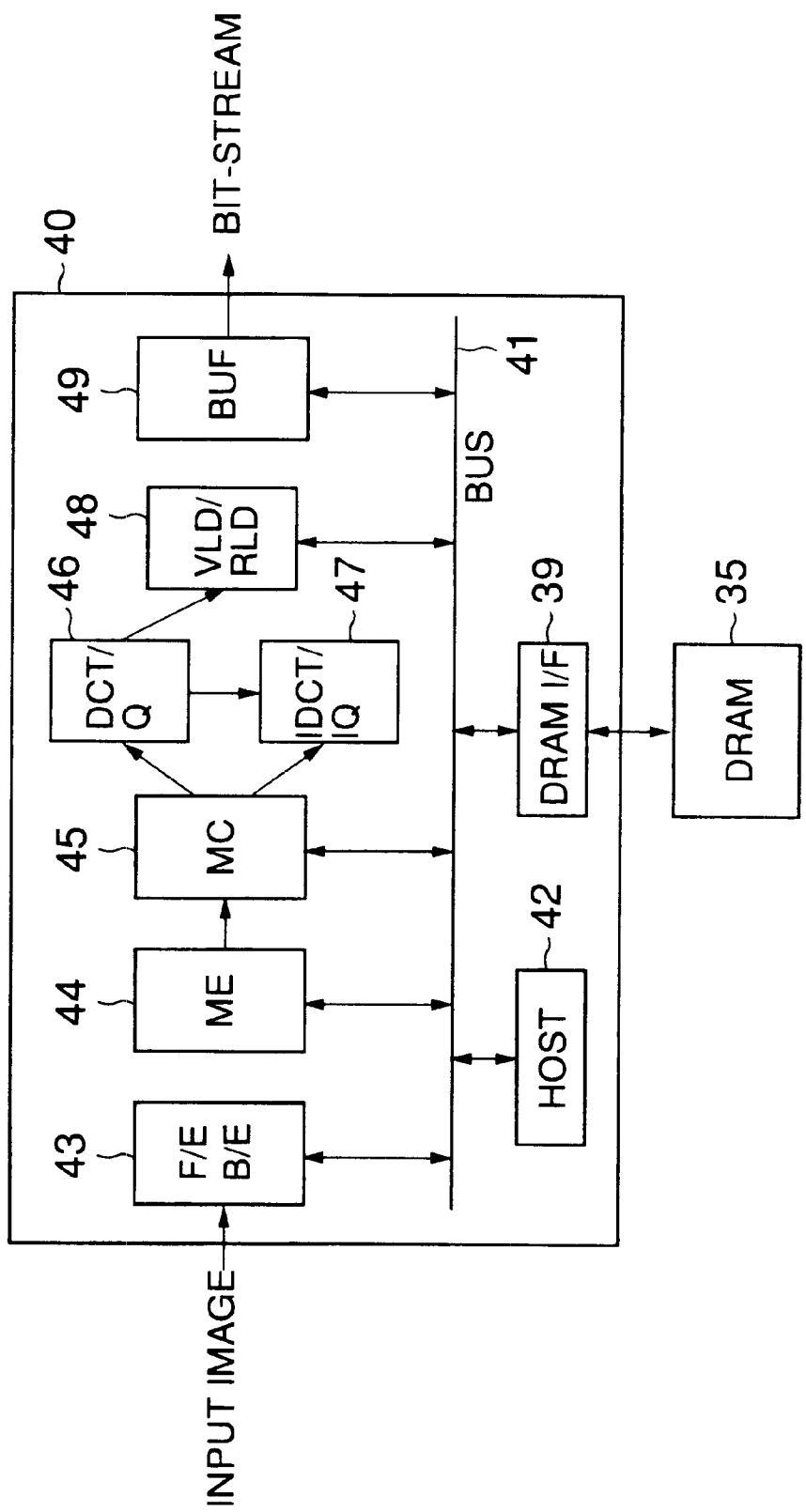
FIG. 16 is a block diagram showing the structure wherein an MPEG2 encoder, in which a motion vector estimating system according to the present invention is incorporated, is mounted on an LSI chip.

When the first preferred embodiment of a motion vector estimating system according to the present invention, which has been described referring to FIG. 2, is mounted in an LSI, an MPEG2 encoder LSI including the motion vector estimating system is preferably mounted since there is no sense in mounting only the motion vector estimating system in view of the current technology. Referring to FIG. 16, the construction of the MPEG2 encoder LSI will be described. In FIG. 16, an MPEG2 encoder 40 comprises: an external memory, e.g., a dynamic random access memory (DRAM) 35; a DRAM interface 39 for exchanging data; an internal bus 41 by which the respective elements are connected; a host part 42 for controlling the whole LSI; a filter element (FE/BE) 43 for filtering inputted image data; a primary motion vector estimation (ME) part 44 for carrying out a primary motion vector estimation; a secondary motion vector estimation (motion compensation: MC) part 45 for carrying out a secondary motion vector estimation and a motion compensation; a DCT/Q part 46 for carrying out a discrete cosine transform (DCT) and a quantization; a DCT/Q part 47 for carrying out an inverse discrete cosine transform (IDCT) and an inverse quantization (IQ); a VLC/RLC part 48 for carrying out a variable length coding (VLC) and a run-length coding (RLC); and a buffer (BUF) 49 for temporarily storing a bit stream to be outputted.

Thus, the motion vector estimating system of the present invention can be mounted in an LSI as an MPEG2 encoder. In this MPEG2 encoder 40, the motion vector estimating system according to the present invention is applied to a part of the ME part 44 and MC part 45. By thus mounting the motion vector estimating system of the present invention in the LSI chip for the MPEG2 encoder 40, the present invention can be easily carried out only by exchanging the chip of the encoder, so that it is possible to simply and quickly cope with the improvement of the image processing technique.

While the motion vector estimating system in the above described first preferred embodiment has carried out the secondary motion vector estimation with a precision of half pixels after correcting the position of the motion vector contacting the boundary on the basis of the primary motion vector position determining part 2, which is the feature of the present invention, and the position determined by the determining part 2, the primary and secondary motion vector estimating parts 1 and 4, the position determining part 2 and the primary motion vector correcting part 3 may be realized by a software including a predetermined procedure or a hardware, such as a mounted LSI chip. When it is realized by a hardware, circuit parts having the functions of the respective parts shown in FIG. 2 may be provided to be incorporated into, e.g., an LSI of a single chip. However, it is not always required to form all of the parts by a hardware. For example, only a part of optional processes of the functions may be carried out by a software.

Figure 17:
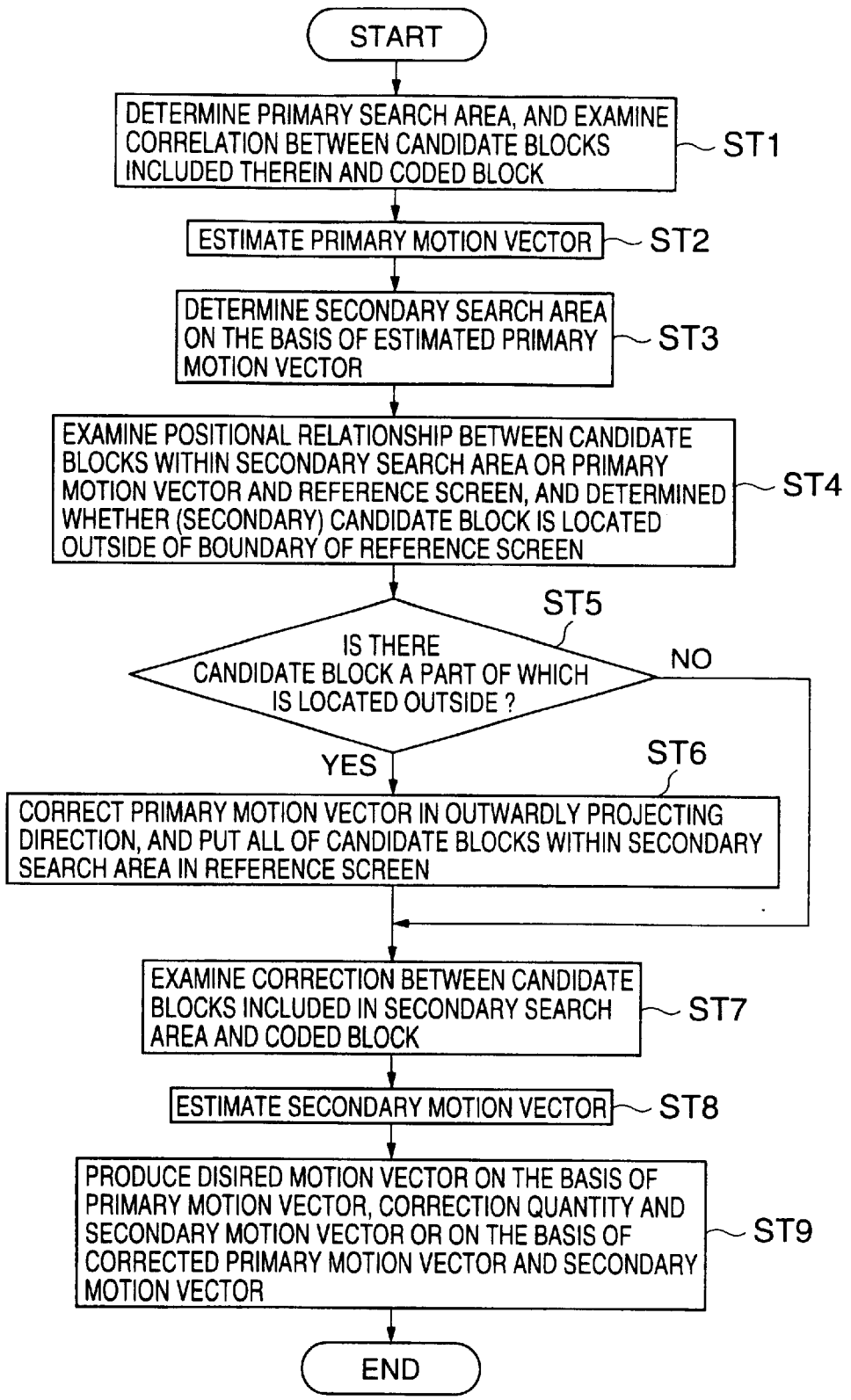
FIG. 17 is a flow chart showing processing steps in a preferred embodiment of a motion vector estimating method according to the present invention.

With the above described construction, the preferred embodiments of a motion vector estimating method according to the present invention will be described below. As shown in FIG. 17, the first preferred embodiment of a motion vector estimating method according to the present invention comprises: a first step ST1 of obtaining the correlation between a coded block occupying an optional area on a screen of a coded current image, and a plurality of candidate blocks which exist in a search area having an optional size on a screen of a reference image temporally different from the current image and which occupies the same area as that of the coded block; a second step ST2 of selecting a candidate block having the highest correlation from the plurality of candidate blocks to obtain a displacement at that time as a primary motion vector; a third step ST3 of determining a secondary search area on the basis of the primary motion vector; a fourth step ST4 of estimating a positional relationship between a plurality of candidate blocks, which occupy the same area as that of the coded block existing in the determined secondary search area, or the primary motion vector and the reference screen to determine whether the secondary search area or the secondary candidate block is positioned outside of the boundary of the reference screen; a fifth step ST5 of determining whether a part of the secondary search area or secondary candidate block is positioned outside of the boundary; a sixth step ST6 of correcting the position on the basis of the primary motion vector so that the secondary search area or the secondary candidate block is located inside of the boundary of the reference screen, when it is determined at the fifth step ST5 that the part of the secondary search area or secondary candidate block is positioned outside of the boundary; a seventh step ST7 of obtaining the correlation between the coded block, which exists in the (corrected) secondary search area based on the motion vector, the position of which has been corrected, and the plurality of (corrected) secondary candidate blocks occupying the same area as that of the coded block; an eighth step ST8 of selecting a secondary candidate block having the highest correlation from the plurality of secondary candidate blocks to obtain a displacement at that time as a secondary motion vector; and a ninth step ST9 of obtaining a desired motion vector on the basis of the primary motion vector, the correction quantity and the secondary motion vector. If it is determined at the fifth step ST5 that a part of the secondary search area or secondary candidate block is not positioned outside of the boundary, the routine passes through the sixth step ST6 to jump to the seventh step ST7.

In the first preferred embodiment of a motion vector estimating method according to the present invention, the sixth step ST6 of correcting the position with a precision of half pixels with respect to the primary motion vector is designed to move the primary motion vector or the search area to the inside of the reference screen with a precision of half pixels so that the projecting part is located inside of the boundary of the reference screen when the part of the search area for primary motion vectors or candidate block projects outwardly from the boundary of the reference screen.

In the above described first preferred embodiment of a motion vector estimating method according to the present invention, while the position has been corrected by moving the search area or candidate block by the projecting area as shown in FIG. 10 when the part of the search area or candidate motion vector block has been positioned outside of the boundary of the reference screen, the present invention should not be limited thereto. In another preferred embodiment of a position correcting method according to the present invention, when a part of the search area or candidate block is positioned outside of the boundary of the reference screen after the primary motion vector is obtained, the projecting part may be removed from the search area or the candidate motion vector block after the search area or the candidate block is extended inside of the reference screen by the projecting part. This method can obtain the same effects as those in the first preferred embodiment of a motion vector estimating method and system according to the present invention.

Figure 18:
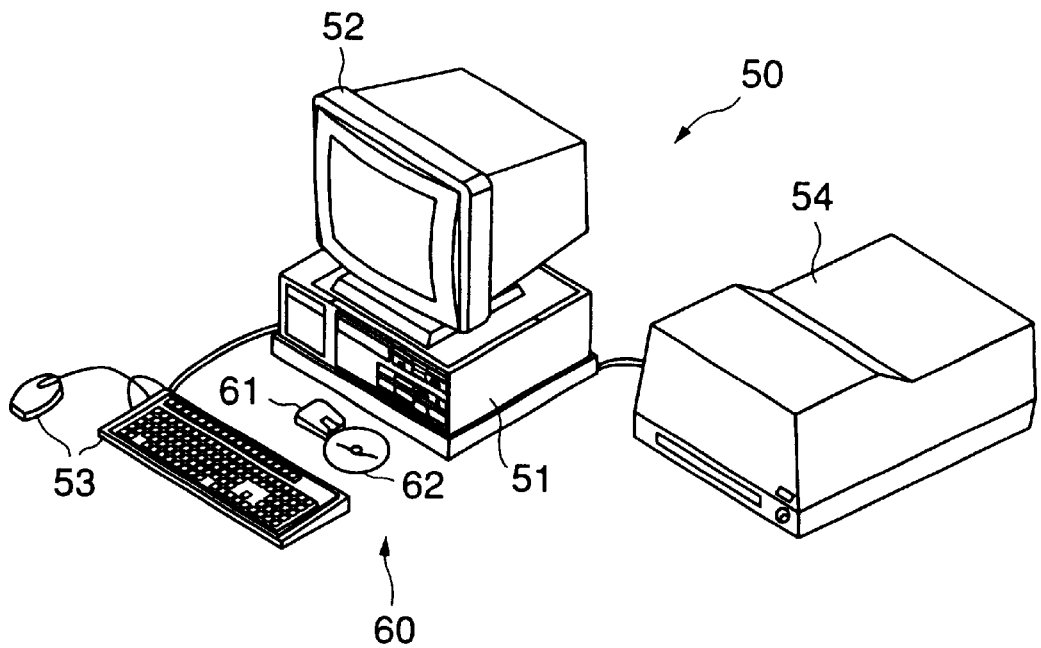
FIG. 18 is a perspective view of a computer system for using a recording medium in which a motion vector estimating procedure according the present invention has been recorded.
Figure 19:
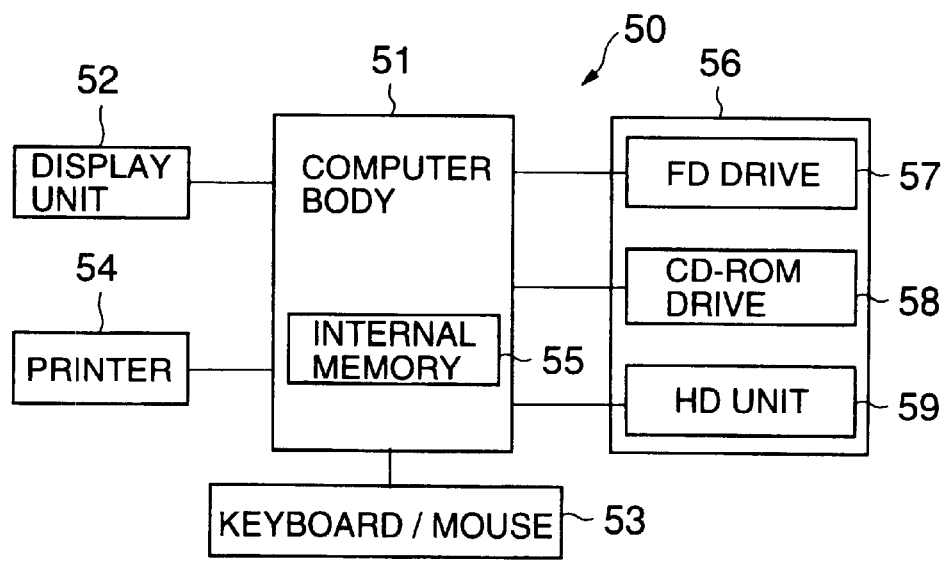
FIG. 19 is a block diagram showing a computer system for using a recording medium in which a motion vector estimating procedure according to the present invention has been recorded.

In the above described preferred embodiments, only the motion vector estimating method and system have been described. However, according to the present invention, the operation procedure of a conventional MPEG2 encoder or the like can be changed by slightly modifying the contents of processing of a CPU or MPU by a computer program wherein a motion vector estimating procedure has been recorded in a recording medium. Referring to FIGS. 18 and 19, the storage of a motion vector estimating procedure from such a recording medium will be described below.

FIGS. 18 and 19 are perspective view and block diagram showing an example of a computer system 50 using a recording medium in which a preferred embodiment of a motion vector estimating procedure according to the present invention has been recorded. In FIG. 18, the computer system 50 comprises a computer body 51 including a CPU, a display unit 52, such as a cathode ray tube (CRT), an input unit 53, such as a keyboard or mouse, and a printer 54 for carrying out print.

As shown in FIG. 19, the computer body 51 comprises an internal memory 55 of a RAM, and a memory unit 56 which can be provided inside or outside of the computer body 51. The memory unit 56 includes a flexible or floppy disk drive (FD) 57, a compact disk-read only memory (CD-ROM) drive 58 and a hard disk (HD) unit 56. As shown in FIG. 18, as a recording medium 60 for use in the memory unit 56, a flexible or floppy disk (FD) 61 inserted into a slot of the FD drive 57, or a CD-ROM 62 for use in the CD-ROM drive 58 is used.

In FIGS. 18 and 19, the FD 61 and the CD-ROM 62 is shown as an example of the recording medium for use in a typical computer system. However, since the present invention particularly relates to a motion vector estimating program for processing image data, recording media other than the above described recording media may be used. For example, the software may be exchanged by replacing a ROM chip, which serves as a nonvolatile memory located within an image processing system, such as a television tuner or a video recorder, and in which a motion vector estimating procedure has been recorded, with a ROM chip in which a conventional motion vector estimating program has been recorded.

The recording medium 60 stores therein: a procedure for obtaining the correlation between a coded block occupying an optional area on a screen of a coded current image, and a plurality of candidate blocks which exist in a search area having an optional size on a screen of a reference image temporally different from the current image and which occupies the same area as that of the coded block; a procedure for selecting a candidate block having the highest correlation from the plurality of candidate blocks to obtain a displacement at that time as a primary motion vector; a procedure for determining a secondary search area on the basis of the primary motion vector to estimate a positional relationship between a plurality of candidate blocks, which occupy the same area as that of the coded block existing in the determined secondary search area, or the primary motion vector and the reference screen to determine whether the secondary search area or the secondary candidate block is positioned outside of the boundary of the reference screen; a procedure for correcting the position on the basis of the primary motion vector so that the secondary search area or the secondary candidate block is located inside of the boundary of the reference screen, when it is determined that a part of the secondary search area or secondary candidate block is positioned outside of the boundary; a procedure for obtaining the correlation between the plurality of corrected secondary candidate blocks, which exist in the corrected secondary search area based on the motion vector, the position of which has been corrected, and which occupy the same area as that of the coded block, and the coded block; a procedure for selecting a secondary candidate block having the highest correlation from the plurality of secondary candidate blocks to obtain a displacement at that time as a secondary motion vector; and a procedure for obtaining a desired motion vector on the basis of the primary motion vector, the correction quantity and the secondary motion vector.

The procedure for correcting the position of the primary motion vector with a precision of half pixels may be a procedure for moving the primary motion vector or the search area to the inside of the reference screen with a precision of half pixels so that a projecting part the search area for primary motion vectors or candidate block is located inside of the boundary of the reference screen when the part of the search area for primary motion vectors or candidate block projects outwardly from the boundary of the reference screen.

The procedure for correcting the position of the primary motion vector with a precision of half pixels may be a procedure for moving the primary motion vector or the search area for primary motion vectors to the inside of the reference screen with a precision of half pixels by extending the search area or candidate block inside of the reference screen by pixels corresponding to a projecting part of the search area for primary motion vectors or candidate block, and thereafter, by removing the projecting part, when the projecting part of the search area for primary motion vectors or candidate block projects outwardly from the boundary of the reference screen.

As described at the beginning of the description of the preferred embodiments, while the primary motion vector estimation has been carried out with a precision of one pixel and the secondary motion vector estimation has been carried out with a precision of half pixels, the pixel precision in the motion vector estimation according to the present invention should not be limited thereto. The present invention can be carried out by any combinations of the pixel precision in the primary motion vector estimation and the pixel precision in the secondary motion vector estimation.

As described above in detail, according to the motion vector estimating method and system of the present invention, the search area during the secondary motion vector estimation can be located within the reference screen by adding the correction value when the motion vector of the pixel existing at the edge of the reference screen is estimated, so that it is possible to improve the precision of estimation of the secondary motion vector. In addition, since the position in the boundary of the reference screen is corrected between the primary motion vector estimation and the secondary motion vector estimation, it is possible to sufficiently improve the precision of estimation of the motion vector by sufficiently ensuring the search area during the secondary motion vector estimation.

Unlike the prior art, the number of candidate motion vectors does not become smaller than that when all of the search area is located within the reference screen. In addition, when a candidate block having the highest correlation exists just nearby the original search area on the reference screen, the candidate block can be located within an object to be estimated, so that it is possible to sufficiently ensure the estimation precision in the secondary motion vector estimation.

In the above-described first through third preferred embodiments, there are described a motion vector estimation method, system and program in which the desired motion vector is obtained by using the primary and secondary motion vectors and respective moving (correction) quantities thereof. However, the present invention can be applied to entire motion vector estimation method, system and program in which a desired motion vector is obtained by using primary through n-th (n is a positive and integer number) motion vectors and respective correction quantities thereof.

For example, even though the desired motion vector is obtained by the primary and secondary motion vectors in the first though third embodiments, a desired motion vector may be obtained as follows:

A secondary motion vector is first obtained from a primary motion vector and primary correction quantity, a tertiary motion vector is second obtained from the secondary motion vector and secondary correction quantity in the same manner as that of the secondary motion vector, . . . , an i motion vector ($1<i<=n$) is obtained from an (i−1)-th motion vector and (i−1)-th correction quantity in the same manner as that of the former motion vector, and an n motion vector is obtained from an (n−1)-th motion vector and (n−1)-th correction quantity in the same manner as that of the former motion vector. Finally, a desired motion vector is obtained from the primary through (n−1)-th motion vectors, the primary through (n−1)-th correction quantity and the n-th motion vector.

What is claimed is:

1. A method for estimating a motion vector of a dynamic image, said method comprising the steps of:

obtaining the correlation between a coded block occupying an optional area on a screen of a coded current image, and a plurality of candidate blocks which exist in a search area having an optional size on a screen of a reference image temporally different from the current image and which occupies the same area as that of the coded block;

selecting a candidate block having the highest correlation from said plurality of candidate blocks to obtain a displacement at that time as a primary motion vector;

determining a secondary search area on the basis of said primary motion vector to estimate a positional relationship between a plurality of secondary candidate blocks, which occupy the same area as that of said coded block existing in the determined secondary search area, or said primary motion vector and said reference screen to determine whether said secondary search area or said secondary candidate block is positioned outside of the boundary of said reference screen;

correcting the position of said primary motion vector by a correction quantity obtained in the manner that said secondary search area or said secondary candidate block is located inside of the boundary of said reference screen, when it is determined that a part of said secondary search area or secondary candidate block is positioned outside of said boundary;

obtaining the correlation between the plurality of corrected secondary candidate blocks, which exist in the corrected secondary search area based on the motion vector, the position of which has been corrected, and which occupy the same area as that of said coded block, and said coded block;

selecting a secondary candidate block having the highest correlation from said plurality of secondary candidate blocks to obtain a displacement at that time as a secondary motion vector; and obtaining a desired motion vector on the basis of said primary motion vector, said correction quantity and said secondary motion vector.

2. A method for estimating a motion vector as set forth in claim 1, wherein said step of correcting the position on the basis of the primary motion vector moves said primary motion vector or said search area to the inside of said reference screen so that a projecting part of said search area for primary motion vectors or candidate block is located inside of the boundary of said reference screen when said projecting part projects outwardly from the boundary of said reference screen.

3. A method for estimating a motion vector as set forth in claim 1, wherein said step of correcting the position on the basis of the primary motion vector moves said primary motion vector or said search area to the inside of said reference screen by extending said search area or said candidate block inside of said reference screen by pixels corresponding to a projecting part of said search area for primary motion vectors or candidate block, and thereafter, by removing said projecting part, when said projecting part of said search area for primary motion vectors or candidate block projects outwardly from the boundary of said reference screen.

4. A method for estimating a motion vector as set forth in claim 1, wherein said primary motion vector is obtained with a precision of one pixel, and said secondary motion vector or said desired motion vector is obtained with a precision of half pixels.

5. A method for estimating a motion vector as set forth in claim 1, which further comprises a step of variable-length-coding image data by utilizing said desired motion vector.

6. A method for estimating a motion vector of a dynamic image, by obtaining a desired motion vector by using one through n (n is a positive and integer number) motion vector (vectors) and respective moving quantity between respective motion vectors, said method comprising:

a step of obtaining the correlation between a coded block occupying an optional area on a screen of a coded current image, and a plurality of candidate blocks which exist in an (i−1)-th search area (1<i<=n) having an optional size on a screen of a reference image temporally different from the current image and which occupies the same area as that of the coded block;

a step of selecting a candidate block having the highest correlation from said plurality of candidate blocks to obtain a displacement at that time as an (i−1)-th motion vector;

a step of determining an i-th search area on the basis of said (i−1)-th motion vector to estimate a positional relationship between a plurality of i-th candidate blocks, which occupy the same area as that of said coded block existing in the determined i-th search area, or said (i−1)-th motion vector and said reference screen to determine whether said i-th search area or said i-th candidate block is positioned outside of the boundary of said reference screen;

a step of correcting the position of said (i−1)-th motion vector by an (i−1)-th correction quantity obtained in the manner that said i-th search area or said i-th candidate block is located inside of the boundary of said reference screen, when it is determined that a part of said i-th search area or i-th candidate block is positioned outside of said boundary;

a step of obtaining the correlation between the plurality of corrected i-th candidate blocks, which exist in the corrected i-th search area based on the motion vector, the position of which has been corrected, and which occupy the same area as that of said coded block, and said coded block; and a step of selecting a secondary candidate block having the highest correlation from said plurality of i-th candidate blocks to obtain a displacement at that time as an i-th motion vector; and wherein said method further comprising:

a step of obtaining a desired motion vector on the basis of said primary motion vector, primary correction quantity, . . . , (n−1)-th motion vector, (n−1)-th correction quantity, and n-th motion vector.

7. A system for estimating a motion vector of a dynamic image, said system comprising:

a primary motion vector estimating part for obtaining the correlation between a coded block occupying an optional area on a screen of a coded current image, and a plurality of candidate blocks which exist in a search area having an optional size on a screen of a reference image temporally different from the current image and which occupies the same area as that of the coded block, to select a candidate block having the highest correlation from said plurality of candidate blocks to obtain a displacement at that time as a primary motion vector;

a primary motion vector position determining part for determining a secondary search area on the basis of said primary motion vector to estimate a positional relationship between a plurality of secondary candidate blocks, which occupy the same area as that of said coded block existing in the determined secondary search area, or said primary motion vector and said reference screen to determine whether said secondary search area or said secondary candidate block is positioned outside of the boundary of said reference screen;

a primary motion vector position correcting part for correcting the position of said primary motion vector by a correction quantity obtained in the manner that said secondary search area or said secondary candidate block is located inside of the boundary of said reference screen, when it is determined that a part of said secondary search area or secondary candidate block is positioned outside of said boundary;

a secondary motion vector estimating part for obtaining the correlation between the plurality of corrected secondary candidate blocks, which exist in the corrected secondary search area based on the motion vector, the position of which has been corrected, and which occupy the same area as that of said coded block, and said coded block, to select a secondary candidate block having the highest correlation from said plurality of secondary candidate blocks to obtain a displacement at that time as a secondary motion vector; and a desired motion vector estimating part for obtaining a desired motion vector on the basis of said primary motion vector, said correction quantity and said secondary motion vector.

8. A system for estimating a motion vector as set forth in claim 7, wherein said primary motion vector position correcting part moves said primary motion vector or said search area to the inside of said reference screen so that a projecting part of said search area for primary motion vectors or candidate block is located inside of the boundary of said reference screen when said projecting part projects outwardly from the boundary of said reference screen.

9. A system for estimating a motion vector as set forth in claim 7, wherein said primary motion vector is obtained with a precision of one pixel, and said secondary motion vector or said desired motion vector is obtained with a precision of half pixels.

10. A system for estimating a motion vector as set forth in claim 7, which further comprises a variable length coding part for variable-length-coding image data by utilizing said desired motion vector.

11. A system for estimating a motion vector as set forth in claim 7, wherein said primary motion vector position correcting part moves said primary motion vector or said search area to the inside of said reference screen by extending said search area or said candidate block inside of said reference screen by pixels corresponding to a projecting part of said search area for primary motion vectors or candidate block, and thereafter, by removing said projecting part, when said projecting part of said search area for primary motion vectors or candidate block projects outwardly from the boundary of said reference screen.

12. A system for estimating a motion vector of a dynamic image, by obtaining a desired motion vector by using one through n (n is a positive and integer number) motion vector (vectors) and respective moving quantity between respective motion vectors, said system comprising:
  an (i−1)-th motion vector estimating part for obtaining the correlation between a coded block occupying an optional area on a screen of a coded current image, and a plurality of candidate blocks which exist in an (i−1)-th search area (1<i<=n) having an optional size on a screen of a reference image temporally different from the current image and which occupies the same area as that of the coded block, to select a candidate block having the highest correlation from said plurality of candidate blocks to obtain a displacement at that time as an (i−1) -th motion vector;
  an (i−1)-th motion vector position determining part for determining an i-th search area on the basis of said (i−1)-th motion vector to estimate a positional relationship between a plurality of i-th candidate blocks, which occupy the same area as that of said coded block existing in the determined i-th search area, or said (i−1)-th motion vector and said reference screen to determine whether said i-th search area or said i-th candidate block is positioned outside of the boundary of said reference screen;
  an (i−1)-th motion vector position correcting part for correcting the position of said (i−1)-th motion vector by a correction quantity obtained in the manner that said i-th search area or said i-th candidate block is located inside of the boundary of said reference screen, when it is determined that a part of said i-th search area or i-th candidate block is positioned outside of said boundary;
  an i-th motion vector estimating part for obtaining the correlation between the plurality of corrected i-th candidate blocks, which exist in the corrected i-th search area based on the motion vector, the position of which has been corrected, and which occupy the same area as that of said coded block, and said coded block, to select an i-th candidate block having the highest correlation from said plurality of i-th candidate blocks to obtain a displacement at that time as an i-th motion vector; and
  a desired motion vector estimating part for obtaining a desired motion vector on the basis of said (i−1)-th motion vector, said correction quantity and said i-th motion vector.

13. A computer program including motion vector estimating procedures which comprise:
  a procedure for obtaining the correlation between a coded block occupying an optional area on a screen of a coded current image, and a plurality of candidate blocks which exist in a search area having an optional size on a screen of a reference image temporally different from the current image and which occupies the same area as that of said coded block;
  a procedure for selecting a candidate block having the highest correlation from said plurality of candidate blocks to obtain a displacement at that time as a primary motion vector;
  a procedure for determining a secondary search area on the basis of said primary motion vector to estimate a positional relationship between a plurality of candidate blocks, which occupy the same area as that of said coded block existing in the determined secondary search area, or said primary motion vector and said reference screen to determine whether said secondary search area or said secondary candidate block is positioned outside of the boundary of said reference screen;
  a procedure for correcting the position of said primary motion vector by a correction quantity obtained in the manner that said secondary search area or said secondary candidate block is located inside of the boundary of said reference screen, when it is determined that a part of said secondary search area or secondary candidate block is positioned outside of said boundary;
  a procedure for obtaining the correlation between said plurality of corrected secondary candidate blocks, which exist in said corrected secondary search area based on the motion vector, the position of which has been corrected, and which occupy the same area as that of said coded block, and said coded block;
  a procedure for selecting a secondary candidate block having the highest correlation from said plurality of secondary candidate blocks to obtain a displacement at that time as a secondary motion vector; and
  a procedure for obtaining a desired motion vector on the basis of said primary motion vector, said correction quantity and said secondary motion vector.

14. A computer program including motion vector estimating procedures as set forth in claim 13, wherein said procedure for correcting the position on the basis of the primary motion vector moves said primary motion vector or said search area to the inside of said reference screen so that a projecting part of said search area for primary motion vectors or candidate block is located inside of the boundary of said reference screen when said projecting part projects outwardly from the boundary of said reference screen.

15. A computer program including motion vector estimating procedures as set forth in claim 13, wherein said procedure for correcting the position on the basis of the primary motion vector moves said primary motion vector or said search area to the inside of said reference screen by extending said search area or said candidate block inside of said reference screen by pixels corresponding to a projecting part of said search area for primary motion vectors or candidate block, and thereafter, by removing said projecting part, when said projecting part of said search area for primary motion vectors or candidate block projects outwardly from the boundary of said reference screen.

16. A computer program including motion vector estimating procedures as set forth in claim 13, wherein said primary motion vector is obtained with a precision of one pixel, and said secondary motion vector or said desired motion vector is obtained with a precision of half pixels.

17. A computer program including motion vector estimating procedures as set forth in claim 13, which further includes a procedure for variable-length-coding image data by utilizing said desired motion vector.

18. A computer program including motion vector estimating procedure, for obtaining a desired motion vector by using one through n (n is a positive and integer number) motion vector (vectors) and respective moving quantity between respective motion vectors, said computer program comprising:

- a procedure for obtaining the correlation between a coded block occupying an optional area on a screen of a coded current image, and a plurality of candidate blocks which exist in an (i−1)-th search area (1<i<=n) having an optional size on a screen of a reference image temporally different from the current image and which occupies the same area as that of said coded block;
- a procedure for selecting a candidate block having the highest correlation from said plurality of candidate blocks to obtain a displacement at that time as a primary motion vector;
- a procedure for determining an i-th search area on the basis of said (i−1)-th motion vector to estimate a positional relationship between a plurality of i-th candidate blocks, which occupy the same area as that of said coded block existing in the determined i-th search area, or said (i−1)-th motion vector and said reference screen to determine whether said i-th search area or said i-th candidate block is positioned outside of the boundary of said reference screen;
- a procedure for correcting the position of said (i−1)-th motion vector by a correction quantity obtained in the manner that said i-th search area or said i-th candidate block is located inside of the boundary of said reference screen, when it is determined that a part of said i-th search area or i-th candidate block is positioned outside of said boundary;
- a procedure for obtaining the correlation between said plurality of corrected i-th candidate blocks, which exist in said corrected i-th search area based on the motion vector, the position of which has been corrected, and which occupy the same area as that of said coded block, and said coded block; and
- a procedure for selecting a i-th candidate block having the highest correlation from said plurality of i-th candidate blocks to obtain a displacement at that time as a i-th motion vector;
- and wherein said computer program further comprising: a procedure for obtaining a desired motion vector on the basis of a primary motion vector, a primary correction quantity, . . . , said (i−1)-th motion vector, said (i−1)-th correction quantity, said i-th motion vector, i-th correction quantity and n-th motion vector.

* * * * *